United States Patent [19]
Kerkman et al.

[11] Patent Number: 6,014,497
[45] Date of Patent: Jan. 11, 2000

[54] METHOD AND APPARATUS FOR DETERMINING A CRITICAL DWELL TIME FOR USE IN MOTOR CONTROLS

[75] Inventors: Russel J. Kerkman, Milwaukee; David Leggate, New Berlin; Gary L. Skibinski, Milwaukee, all of Wis.

[73] Assignee: Allen-Bradley Company, LLC, Milwaukee, Wis.

[21] Appl. No.: 08/942,339

[22] Filed: Oct. 1, 1997

[51] Int. Cl.[7] .................................................. H02P 5/17
[52] U.S. Cl. ............................ 388/811; 318/811; 318/254
[58] Field of Search .................................. 318/810, 811, 318/254; 361/33; 363/160, 161, 132

[56] References Cited

U.S. PATENT DOCUMENTS

| | | | |
|---|---|---|---|
| 3,958,131 | 5/1976 | Mozdzer | 307/106 |
| 4,417,448 | 11/1983 | Horn et al. | 62/6 |
| 4,468,725 | 8/1984 | Venturiny | 363/160 |
| 4,578,746 | 5/1986 | Gyugyi et al. | 363/161 |
| 5,581,169 | 12/1996 | Kerkman et al. | 318/811 |
| 5,625,550 | 4/1997 | Leggate et al. | 363/132 |

*Primary Examiner*—Paul Ip
*Assistant Examiner*—Rita Leykin
*Attorney, Agent, or Firm*—Michael A. Jaskolski; John M. Miller; John J. Horn

[57] ABSTRACT

A method and apparatus for determining the critical dwell time required between firing pulses generated by a PWM inverter to eliminate greater than twice overvoltage on motor supply lines. Critical dwell time is correlated with line parameters including inductance and resistance per unit length and is then provided to a controller to alter voltages provided to a motor to eliminate overvoltage.

17 Claims, 14 Drawing Sheets

| MOTOR/DRIVE HORSEPOWER HP | AWG OF TYPICAL 75 DEG. C COPPER CABLE MIN–MAX | TESTED CABLE AWG. | Tα DWELL TIME (µS) USED FOR 300 FT. CABLE |
|---|---|---|---|
| 0.5 | 18–10 | | 7.5 |
| 0.75 | 18–10 | | 7.5 |
| 1 | 18–10 | | 7.5 |
| 1.5 | 18–10 | | 7.5 |
| 2 | 18–10 | 16 & 12 | 7.5 |
| 3 | 18–10 | | 10 |
| 5 | 18–10 | 12 | 10 |
| 7.5 | 10–8 | | 11.5 |
| 10 | 10–8 | 12 | 11.5 |
| 15 | 10–8 | | 12 |
| 20 | 10–6 | | 12 |
| 25 | 8–6 | | 12.5 |
| 30 | 8–6 | 8 | 12.5 |
| 40 | 6–3 | | 12.5 |
| 50 | 6–2 | 2 | 12.5 |
| 60 | 6–2 | | 12.5 |

METHOD AND APPARATUS FOR DETERMINING A CRITICAL DWELL TIME FOR USE IN MOTOR CONTROLS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor controllers and more particularly, to a method and an apparatus for altering stator winding voltages to eliminate greater than twice over voltage.

Many motor applications require that a motor be driven at various speeds. Motor speed can be adjusted with an Adjustable Speed Drive (ASD) which is placed between a voltage source and an associated motor that can excite the motor at various frequencies. One commonly used type of ASD uses a three-phase Pulse Width Modulated (PWM) inverter and associated PWM controller which can control both voltage and frequency of signals that eventually reach motor stator windings.

A three-phase PWM controller receives three reference or modulating signals and a triangle carrier signal, compares each modulating signal to the carrier signal and generates firing signals consisting of a plurality of pulses corresponding to each modulating signal. When a modulating signal has a greater instantaneous amplitude than the carrier signal, a corresponding firing signal is high producing a pulse on-time. When a modulating signal has an instantaneous amplitude that is less than the carrier signal, a corresponding firing signal is low producing a pulse off-time.

The firing signals are used to control the PWM inverter. A three-phase PWM inverter consists of three pairs of switches, each switch pair including series arranged upper and lower switches configured between positive and negative DC power supplies. Each pair of switches is linked to a unique motor terminal by a unique supply line, each supply line is connected to a node between an associated pair of switches. Each firing signal controls an associated switch pair to alternately connect a stator winding between the positive and negative DC power supplies to produce a series of high frequency voltage pulses that resemble the firing signals. A changing average of the high frequency voltage pulses over a period defines a fundamental low frequency alternating line-to-line voltage between motor terminals that drives the motor.

Insulated Gate Bipolar Transistors (IGBTs) are the latest power semiconductor switches used in the PWM inverter, IGBTs have fast rise times and associated switching speeds (e.g. 50–400 ns) that are at least an order of magnitude faster than BJTs and other similar devices. At IGBT switching speeds, switching frequency and efficiency, and the quality of terminal voltages, are all appreciably improved. In addition, the faster switching speeds reduce harmonic heating of the motor winding as well as reduce audible motor lamination noise.

While IGBT PWMs are advantageous for all of the reasons identified above, when combined with certain switch modulating techniques (i.e. certain on/off switching sequences), IGBT fast dv/dt or rise times can reduce the useful life of motor components and/or drive to motor voltage supply lines. In particular, while most motors and supply lines are designed to withstand operation at rated line voltages for long periods and to withstand predictable overvoltage levels for short periods, in many cases, fast switch rise times causes overvoltages that exceed design levels.

For a long time the industry has recognized and configured control systems to deal with twice overvoltage (i.e. twice the PWM inverter DC power supply level) problems. As well known in the controls art, twice overvoltage levels are caused by various combinations of line voltage rise time and magnitude, imperfect matches between line-to-line supply cable and motor surge impedances, and cable length. Line voltage frequency and switch modulating techniques have little effect on twice overvoltage levels.

One common way to cope with twice overvoltage levels has been to reduce reflected voltage by terminating the cable supply lines at the motor terminals with a cable to motor surge impedance matching network. Resistor-Inductor-Capacitor or R-L-C filter networks mounted at the drive output are also used to change and reduce the slope of the voltage pulses (i.e. the turn on times) as they arrive. This network increases the cable distance where twice voltage in the motor terminals is developed to a length outside the application distance of interest. In addition, to reduce the possibility of damage from periodic twice overvoltage levels, most cable supply lines and motors are insulated to withstand periodic twice overvoltage levels. Thus, the industry has developed different system configurations for dealing with twice overvoltage.

Unfortunately, there is another potentially more damaging overvoltage problem that has not been satisfactorily dealt with. The second overvoltage problem is referred to herein as greater than twice overvoltage. Unlike twice overvoltage, greater than twice overvoltage is caused by faster IGBT switching frequencies and faster IGBT dv/dt rise times interacting with two different common switch modulating techniques, that result in overvoltage problems referred to as "double pulsing" and "polarity reversal".

Referring to FIG. 1, double pulsing will be described in the context of an IGBT inverter generated line-to-line voltage $V_i$ applied to a line cable and a resulting motor line-to-line terminal voltage $V_m$. Initially, at time $\tau_1$, the line is shown in a fully-charged condition ($V_i(\tau_1)=V_m(\tau_1)=V_{DC}$). A transient motor voltage disturbance is initiated in FIG. 1 by discharging the line at the inverter output to zero voltage, starting at time $\tau_2$, for approximately 4 $\mu$sec. The pulse propagation delay between the inverter terminals and motor terminals is proportional to cable length and is approximately 1 $\mu$sec for the assumed conditions. At time $\tau_3$, 1 $\mu$sec after time $\tau_2$, a negative going $V_{DC}$ voltage has propagated to the motor terminals. In this example, a motor terminal reflection coefficient $\Gamma_m$ is nearly unity. Thus, the motor reflects the incoming negative voltage and forces the terminal voltage $V_m$ to approximately negative bus voltage:

$$V_m(\tau_3)=V_m(\tau_1)-V_{DC}(1+\Gamma_m)\approx-V_{DC} \qquad \text{Eq. 1}$$

A reflected wave ($-V_{DC}$) travels from the motor to the inverter in 1 $\mu$sec and is immediately reflected back toward the motor. Where an inverter reflection coefficient $\Gamma_i$ is approximately negative unity, a positive $V_{DC}$ pulse is reflected back toward the motor at time $\tau_4$. Therefore, at time $\tau_4$ the discharge at time $\tau_2$ alone causes a voltage at the motor terminal such that:

$$V_m(\tau_4)=V_m(\tau_1)-V_{DC}(1+\Gamma_m)-V_{DC}\Gamma_i\Gamma_m(1+\Gamma_m)\approx V_{DC} \qquad \text{Eq. 2}$$

In addition, at time $\tau_4$, with the motor potential approaching $V_{DC}$ due to the $\tau_2$ discharge, the inverter pulse $V_i(\tau_4)$ arrives and itself recharges the motor terminal voltage to $V_{DC}$. Pulse $V_i(\tau_4)$ is reflected by the motor and combines with $V_m(\tau_4)$ to achieve a peak value of approximately three times the DC rail value:

$$V_m(\tau_4+) = V_m(\tau_1) - V_{DC}(1+\Gamma_m) - V_{DC}\Gamma_i\Gamma_m(1+\Gamma_m) + V_i(\tau_4)(1+\Gamma_m) \approx 3 V_{DC} \quad \text{Eq. 3}$$

Referring to FIG. 2 polarity reversal will be described in the context of an IGBT inverter generated line-to-line voltage $V_{il}$ and a resulting motor line-to-line voltage $V_{ml}$. Polarity reversal occurs when the firing signal of one supply line is transitioning into overmodulation while the firing signal of another supply line is simultaneously transitioning out of overmodulation. Overmodulation occurs when a reference signal magnitude is greater than the maximum carrier signal magnitude so that the on-time or off-time of a switch is equal to the duration of the carrier period. Polarity reversal is common in all types of PWM inverter control.

Initially, the inverter line-to-line voltage $V_{il}(\tau_5)$ is zero volts. At time $\tau_6$, the inverter voltage $V_{il}(\tau_6)$ is increased to $V_{DC}$ and, after a short propacation period, a $V_{DC}$ pulse is received and reflected at the motor terminals thus generating a $2 V_{DC}$ pulse across associated motor lines. At time $\tau_7$, the line-to-line voltage switches polarity (hence the term polarity reversal) so that the inverter voltage $V_{il}(\tau_7)$ is equal to $-V_{DC}$ when the line-to-line motor voltage $V_{ml}(\tau_7)$ has not yet dampened out to a DC value (i.e. may in fact be $2 V_{DC}$). After a short propagation period, the $-V_{DC}$ inverter pulse reaches the motor, reflects, and combines with the inverter reflected pulse $-V_{DC}$ and the positive voltage $2 V_{DC}$ on the motor. The combination generates an approximately $-3 V_{DC}$ line-to-line motor voltage $V_{ml}(\tau_8)$ at time $\tau_8$.

In reality, the amplitude of overvoltages will often be less than described above due to a number of system variables including line AC resistance damping characteristics, DC power supply level, pulse dwell time, carrier frequency $f_c$ modulation techniques, and less than unity reflection coefficients ($\Gamma_m$).

One solution to the double pulsing problem has been to increase the zero voltage dwell time between line-to-line inverter pulses. In other words, referring again to FIG. 1, the discharge time between pulses would be extended from the present 4 $\mu$secs so that, prior to the second pulse $V_i(\tau_4)$ reaching the motor terminals, the motor terminal voltage transient $V_m$ reaches a steady state DC value.

While increasing the zero voltage dwell time between line-to-line inverter pulses eliminates greater than twice overvoltage due to double pulsing, this solution can disadvantageously reduce the amplitude of the resulting fundamental low frequency terminal voltage where high carrier frequencies and overmodulation occurs. For example, referring to FIG. 3, a series of high frequency voltage pulses 5 at a motor terminal and a resulting fundamental low frequency terminal voltage 6 can be observed. In FIG. 3, a positive phase of the low frequency voltage begins at $\tau_9$ and ends at $\tau_{10}$.

To eliminate greater than twice over voltage, one pulse limiting scheme indiscriminately increases the duration of each off time period that is less than a minimum allowable off time. In FIG. 3, the off times of pulses during the overmodulation period i.e., is $\zeta_2$ and $\zeta_3$) are less than the minimum allowable off time and therefore result in on times greater than the maximum on time and thus would be limited. In addition, in many cases greater than twice over voltage will occur prior to and just after overmodulation. Thus, re:erring still to FIG. 3, during periods just before period $\zeta_2$ and just after period $\zeta_3$ off times will also often. be limited. Where the magnitude of the DC power supply is reduced substantially, the number of overmodulation carrier periods having limited on-times increase, proportionally until, at some point, the reduced on-time noticeably affects the low frequency terminal voltage magnitude. In other words, maximum power output is substantially reduced through blind limitation of firing pulses during overmodulation.

While FIG. 3 is only exemplary, it can be seen that during the positive phase (i.e. $\tau_9$–$\tau_{10}$), the four firing pulses that would normally occur during carrier periods $\zeta_1$–$\zeta_4$ would likley all be limited to a maximum on-time according to prior art methods of reducing greater than twice overvoltage. In addition, pulses during periods just before period $\zeta_1$ and just after period $\zeta_4$ may also be limited. In many cases, especially where the DC supply magnitude is minimal or reduced, the reduction in low frequency terminal voltage is unacceptable.

In addition to reducing the magnitude of the fundamental low frequency voltage 6, this solution does not address the polarity reversal problem.

Another solution to the greater than twice overvoltage problem is described in U.S. Pat. No. 5,671,130 entitled METHOD AND APPARATUS FOR CONTROLLING VOLTAGE REFLECTIONS USING A MOTOR CONTROLLER which was filed on Aug. 23, 1996 and is commonly owned with this application. According to this solution a motor controller modifies firing pulses that are provided to an inverter in a manner calculated to eliminate greater than twice overvoltage switching sequences. When the period between two voltage changes is less than the period required for a substantially steady state voltage near zero to be reached, the period between the two changes is increased. Where overmodulation switching sequences result in greater than twice overvoltage due to polarity reversal, the overmodulation switching sequence is altered to eliminate the possibility of greater than twice overvoltage.

This solution contemplates two different methods of altering the switching sequence referred to as the Maximum-Minimum Pulse Technique (MMPT) and the Pulse Elimination Technique (PET) methods. According to the MMPT method, when a PWM pulse has characteristics which could generate greater than twice overvoltage, the pulse width is altered so that its duration is set equal to or between the minimum and maximum pulse times allowed. Importantly, only pulses after importantly, only pulses that cross the threshold level for double pulsing induced motor voltages greater than twice overvoltage and during polarity reversal periods are altered so that the resulting terminal voltage magnitude is only minimally effected. Nevertheless, the terminal voltage magnitude is noticeably reduced as some positive pulse durations during positive half cycles and some negative pulse durations during negative half cycles are reduced when the MMPT method is employed.

According to the PET method, instead of only limiting pulses to within the maximum and minimum pulse times, some of the pulses having characteristics which could generate greater than twice overvoltage are eliminated. In other words, some of the positive pulse durations during positive half cycles are increased and set equal to the carrier period and some of the negative pulse durations are increased and set equal to the carrier period which tend to offset the reduced pulse durations. The result is a terminal voltage magnitude which is essentially unaffected by pulse alterations.

While this solution effectively eliminates greater than twice overvoltage while maintaining a desired terminal voltage, this solution requires a relatively large amount of signal monitoring and comparing to determine which PWM pulses are likely to generate greater than twice overvoltage. For this reason, it may be difficult to implement this solution using the simple microprocessors which are provided in many motor controllers.

In addition, while the critical dwell time between consecutive firing pulses can be determined through experimentation as described in the above reference, this process is somewhat cumbersome and time consuming.

Therefore, it would be advantageous to have a method and apparatus that could eliminate greater than twice overvoltage without distorting the fundamental components of motor terminal voltages and which is relatively simple to implement. In addition, it would be advantageous to have a method and an apparatus for automatically determining the critical dwell time required to eliminate greater than twice overvoltage as a function of the type of cable used for supply lines.

BRIEF SUMMARY OF THE INVENTION

The present invention modifies reference or modulating signals that are provided to a PWM controller for comparison to a carrier signal for generating PWM firing signals to drive a PWM inverter in a manner calculated to eliminate greater than twice overvoltage switching sequences. PWM signal durations, which can be used to determine if greater than twice overvoltage is likely, are directly related to the modulating signal. Therefore, PWM pulse characteristics (i.e. pulse durations) which are likely to cause greater than twice overvoltage are reflected in the modulating signal and the modulating signal can be used to determine during which carrier periods the PWM signals will likely cause greater than twice overvoltage.

In addition, because the modulating signal and PWM pulse durations are directly related, the modulating signal can be controlled or modified to control PWM pulse durations and thereby eliminate greater than twice overvoltage. To this end, according to the present invention, modulating signal characteristics which are known to cause greater than twice overvoltage are identified. Then, during controller operation, the modulating signal is monitored and, when modulating signal characteristics match the characteristics known to cause greater than twice overvoltage, the modulating signal is altered so that greater than twice overvoltage is not generated.

One object of the invention is to eliminate greater than twice overvoltage. By identifying modulating signal characteristics which generate greater than twice overvoltage, comparing modulating signals during controller operation to the characteristics known to cause greater than twice overvoltage and modifying signals accordingly, greater than twice overvoltage can be eliminated.

Specifically, PWM pulse durations are directly related to the magnitude of the modulating signal. Therefore, a maximum voltage magnitude above which greater than twice overvoltage is known to occur can be identified. Then, during controller operation the modulating signal magnitude is monitored and compared to the maximum voltage magnitude.

When the monitored magnitude is greater than the maximum voltage magnitude an overvoltage period occurs. During an overvoltage period the modulating signal is altered by, if the modulating signal is positive, setting the modulating signal equal to a positive value which is greater than or equal to a positive peak carrier signal value and, if the modulating signal is negative, setting the modulating signal equal to a negative value which is less than or equal to a negative peak carrier signal value. Then, when the PWM controller compares the modulating signal to the carrier signal, the resulting PWM signals during overvoltage periods are tied to either the positive or negative DC bus value and switching which could cause double pulse greater than twice overvoltage is eliminated.

Thus, another object of the invention is to eliminate double pulses, resulting in greater than twice overvoltage on the motor, without requiring a large number of calculations which command excessive amounts of processor time. To this end, the only signals that must be monitored during controller operation are the modulating signals and the only calculation is to determine if a modulating signal magnitude is greater than the maximum voltage magnitude.

In another embodiment, where an overvoltage period consists of a plurality of carrier periods, for a predetermined number N of carrier periods at the beginning of the compensation period, the modulating signal is altered such that its magnitude remains at the maximum voltage magnitude. The periods during which the modulating signal remains at the maximum voltage magnitude are referred to herein as porches.

Yet another object of the invention is to eliminate greater than twice overvoltage on the motor due to polarity reversal, yet maintain a desired terminal voltage magnitude. By maintaining the maximum voltage magnitude during the porches and equating the modulating signal to an appropriate value during the remainder of the overvoltage period, the overall terminal voltage magnitude can be approximately maintained. The number of carrier periods which constitute a porch is a function of modulating signal amplitude, frequency and line characteristics and is typically on the order of 1 to 5.

In another aspect, for a predetermined number N of carrier periods at the end of an overvoltage period, the modulating signal is maintained at the maximum voltage magnitude.

Thus, one other object of the invention is to maintain the fundamental component of the terminal voltage while altering the modulating signals to eliminate greater than twice overvoltage. The modulating signal can be tracked several carrier periods in advance so that the last N carrier periods of the compensation period can be identified and altered. When a porch is added at the beginning of an overvoltage period, an identical porch is added at the end of the overvoltage period so that half-wave modulating signal symmetry is maintained which in turn maintains the fundamental terminal voltage component.

The invention also includes a method and an apparatus for determining critical dwell times between consecutive firing pulses to an inverter which will eliminate greater than twice overvoltage. To this end, the method and apparatus use supply line parameters, specifically inductance and resistance per unit length, to determine a desired critical dwell time for specific line construction. The dwell time is then used by the controller to eliminate greater than twice overvoltage.

The invention also includes a method and apparatus for, during a commissioning procedure, determining a plurality of critical dwell times corresponding to a plurality of different supply line types and storing the times as a function of line parameters in a table for use during normal motor operation. Then during normal operation, an operator uses an interface to provide line parameters which can be used to determine a correct dwell time for motor control.

Thus, another object of the invention is to facilitate easy determination of critical dwell times which are dependent on supply line parameters so that cumbersome commissioning can be avoided. To this end, a simple equation for dwell time as a function of line parameters is developed and implemented. Commissioning is further simplified by providing a lookup table of dwell times determined during the commissioning procedure.

Other and further objects, aspects and embodiments of the present invention will become apparent during the course of the following description and by reference to the accompanying drawings.

BRIEF DESCRIPTION OF THE SEVERAL VIEWS OF THE DRAWINGS

FIGS. 5b and 5c are graphs illustrating PWM firing pulses generated by comparison of the signals of FIG. 5a;

FIG. 11b is a graph illustrating firing pulses produced by comparing the signals of FIG. 11a;

FIG. 12b is a graph illustrating firing pulses produced by comparing the signals of FIG. 12a;

FIG. 15b is a graph illustrating firing pulses produced by comparing the signals of FIG. 15a;

Figure 11A:
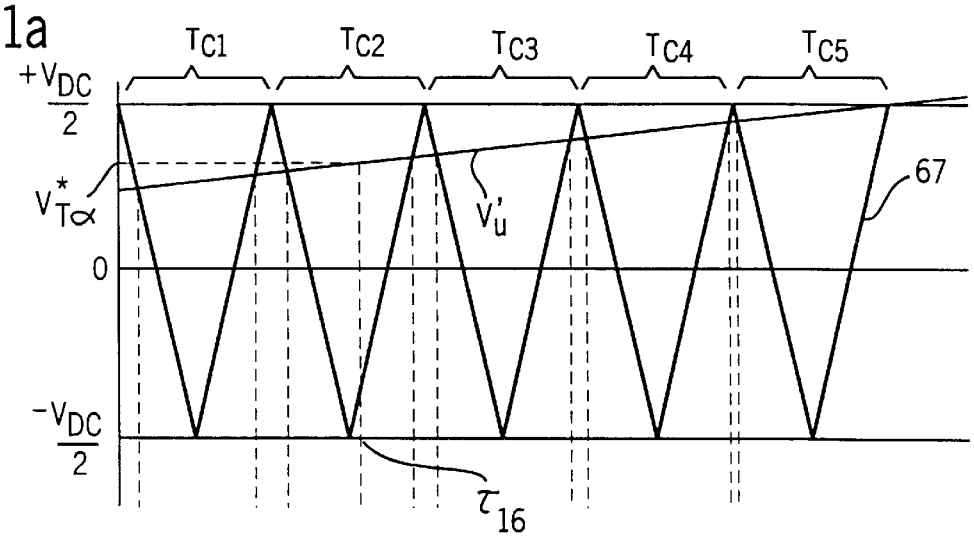
FIG. 11a is a graph illustrating signals used to produce firing pulses.
Figure 16:
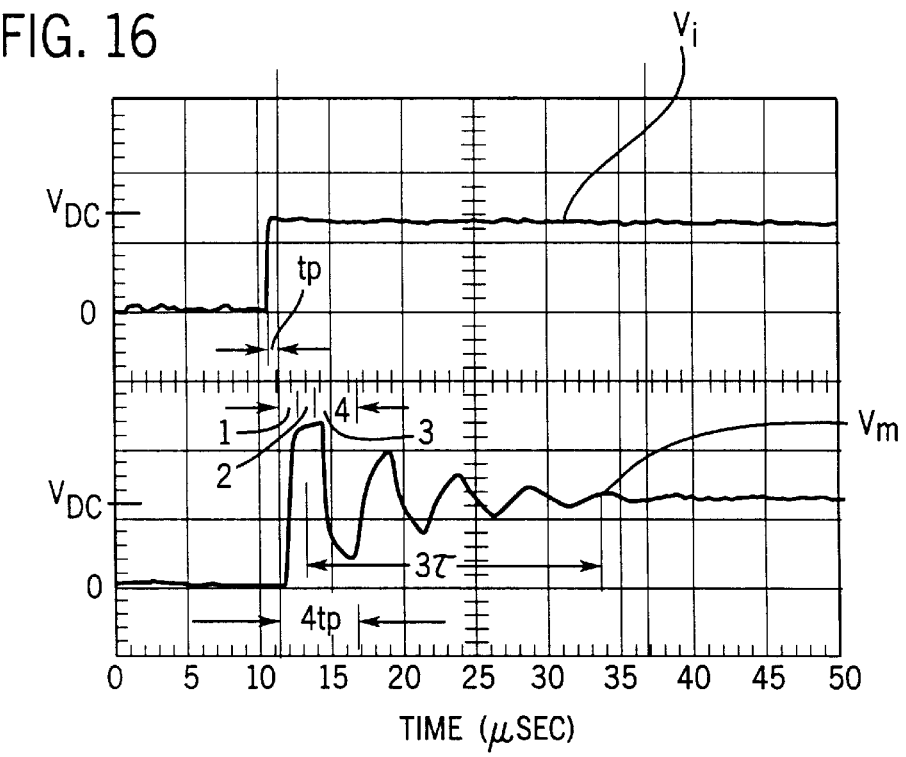
FIG. 16 is a graph illustrating transient charging of a drive motor cable from a single voltage pulse emitted by the drive output, twice motor terminal voltage is illustrated in this case as well as the pulse propagation time from inverter to motor $t_p$, cable oscillation frequency $$\left(f_0 = \frac{1}{4t_p}\right)$$
Figure 17:
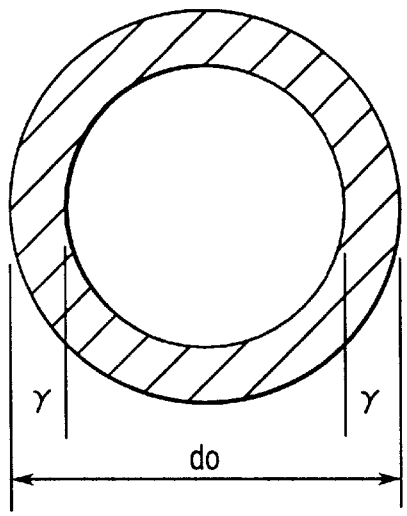
Figure 18:
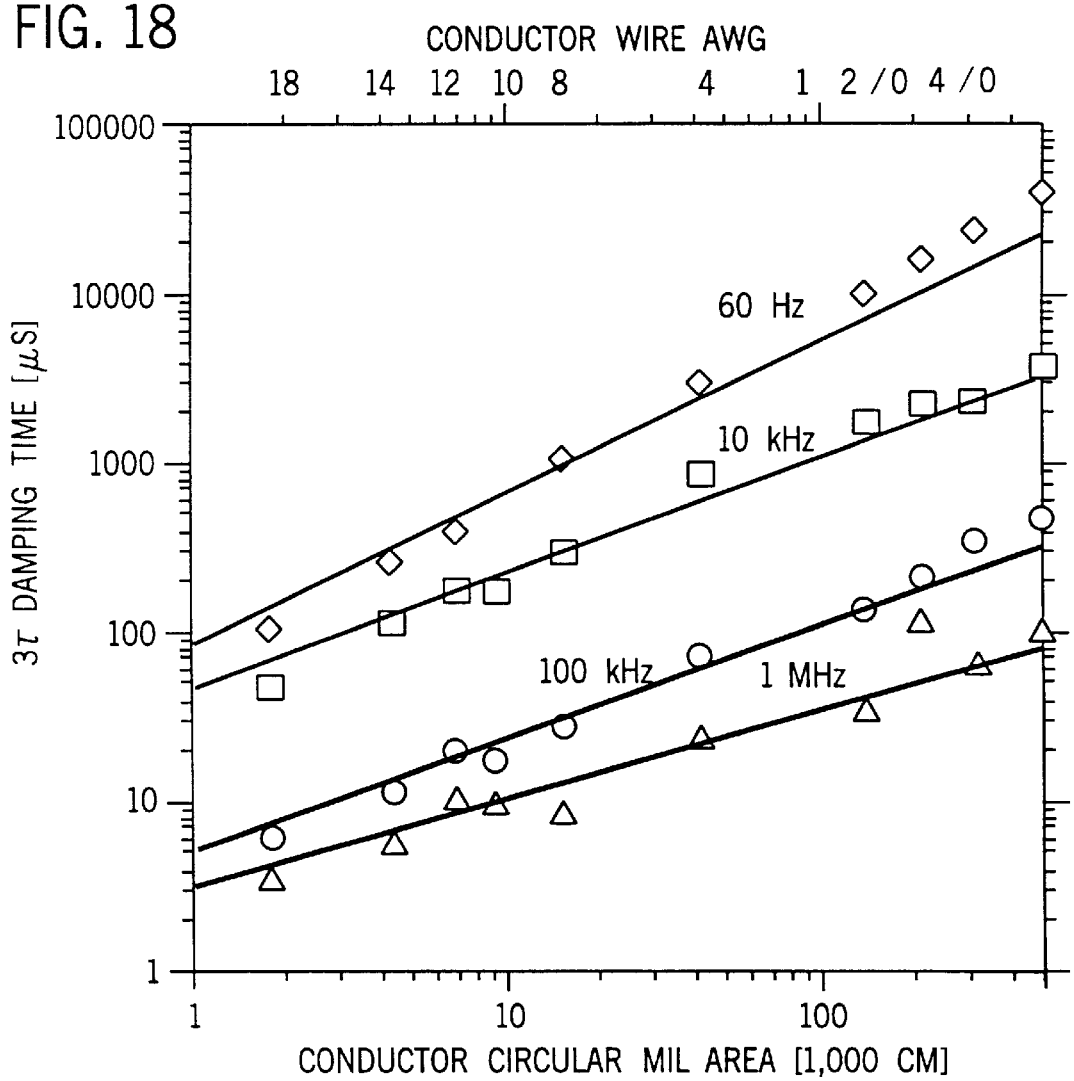
Figures 19, 20:
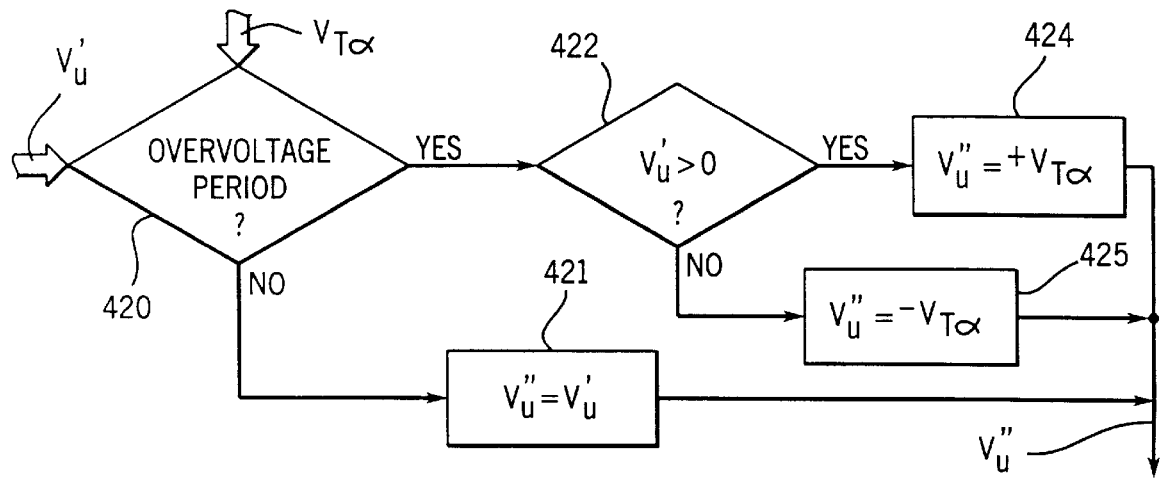
Figure 21A:
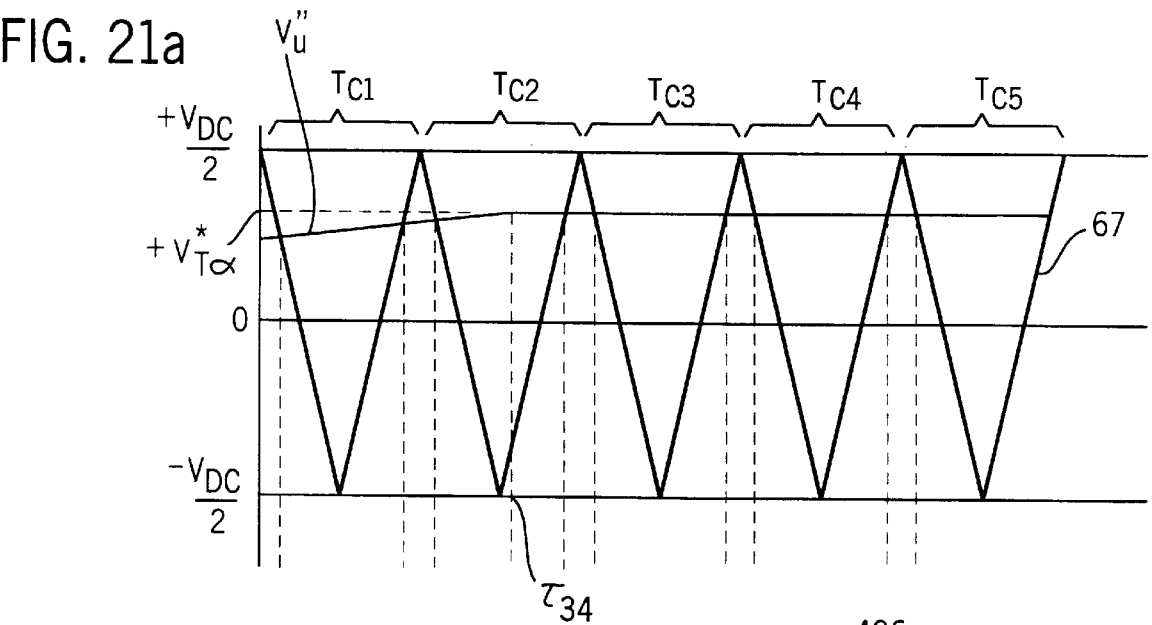
Figure 21B:
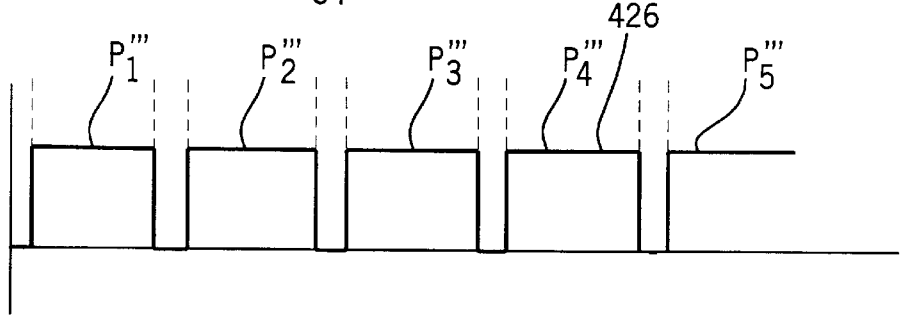
Figure 22:
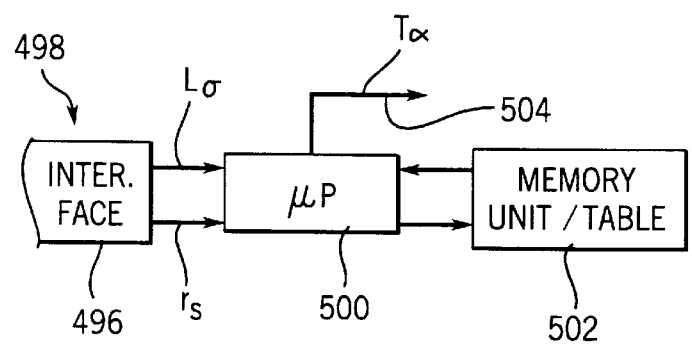

and transient damping time (3τ);

FIG. 17 shows a phase conductor cross-section area with a shaded portion denoting the effective area or skin depth used during high frequency operation;

FIG. 18 is a graph illustrating the 3τ cable damping time of FIG. 16 for several different cable sizes and several cable oscillation frequencies $f_0$;

FIG. 19 is a table indicating critical dwell time Tα for various motor HP sizes and typical cable sizes used, time Tα is approximately equal to the 3τ damping time;

FIG. 20 is a flow chart illustrating a third preferred inventive method;

FIG. 21a is similar to FIG. 11a except that the modulation signal has been modified according to the method of FIG. 20 and FIG. 21b is a graph illustrating firing pulses produced by comparing the signals of FIG. 21a; and FIG. 22 is a schematic diagram of a critical dwell time identifier.

DETAILED DESCRIPTION OF THE INVENTION

A. General Overview of Solution

The present invention will be described in the context of the exemplary PWM inverter 9 shown in FIG. 4. The inverter 9 is shown connected to a PWM controller 11, a DC voltage source 18, and a motor 19. The inverter consists of six solid state switching devices 12–17 (BJT, GTO, IGBT or other transistor technology devices may be used) arranged in series pairs, each switching device 12–17 being coupled with an inverse parallel connected diode 23–29.

Each series arranged pair of switching devices 12 and 13, 14 and 15, and 16 and 17, make up a separate leg 39, 40 or 41 of the inverter 9 and have a common node which is electrically connected to a unique motor terminal 30, 31, or 32 (and thus to a unique stator winding 35, 36 or 37). Each switching device 12–17 is also electrically connected by a firing line 51–56 to controller 11 and through the controller to modulating signal modifier 7 and a modulating signal generator 20.

Source 18 is split so that it creates a high voltage rail 48 and a low voltage rail 49 and each leg 39, 40, 41 connects the high voltage rail 48 to the low voltage rail 49.

To avoid repetitive disclosure, inverter 9 and the inventive modifier 7 will be explained by referring only to leg 39 as all three legs 39, 40, and 41 of the inverter operate and are controlled in the same manner.

Generator 20, modifier 7 and controller 11 operate together to turn the switching devices 12, 13 of leg 39 on and off in a repetitive sequence that alternately connects the high and low voltage rails 48, 49 to, and produces a series of high frequency voltage pulses at, terminal 31.

Figure 5A:
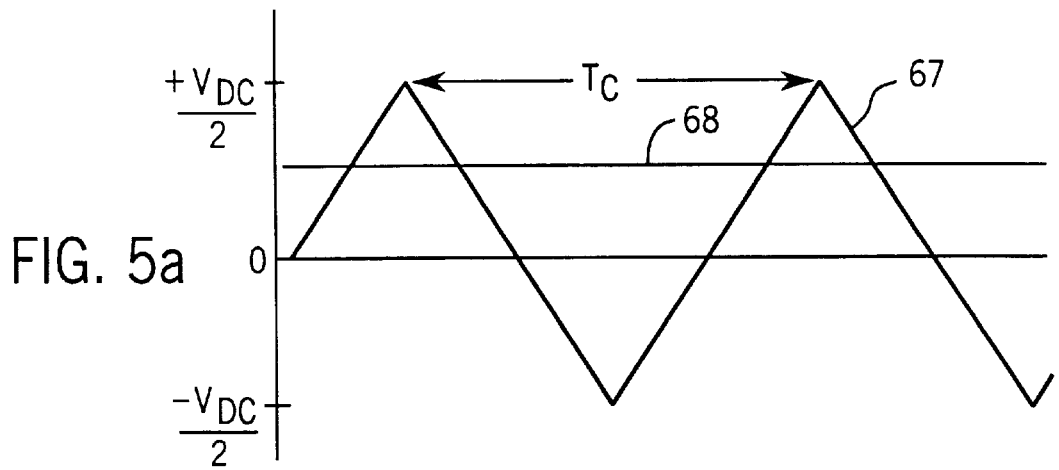
FIG. 5a is a graph illustrating the line-to-ground or per phase modulating signal generator used by a PWM inverter to produce high frequency voltage pulses.

Referring now to FIG. 5a, signals used by controller 11 to generate the firing pulses for leg 39 may be observed. As well known in the art, a carrier signal 67 is perfectly periodic and operates at what is known as the carrier frequency. A modulating signal 68, which is provided by the modulating signal modifier 7 and generator 20, has a much greater period than the carrier signal 67.

Figure 5B:
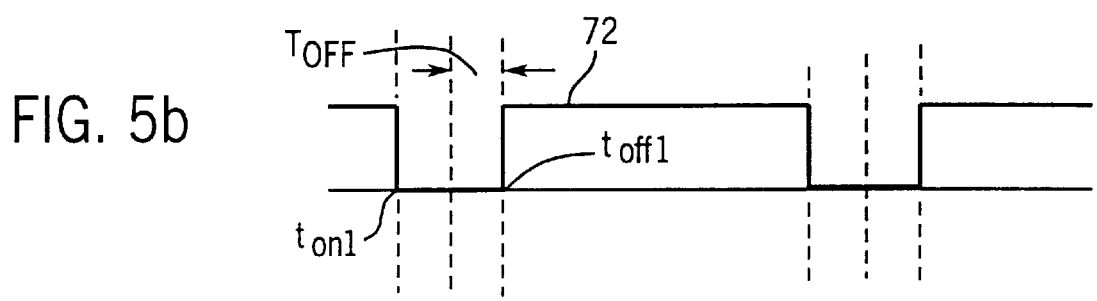
Figure 5C:
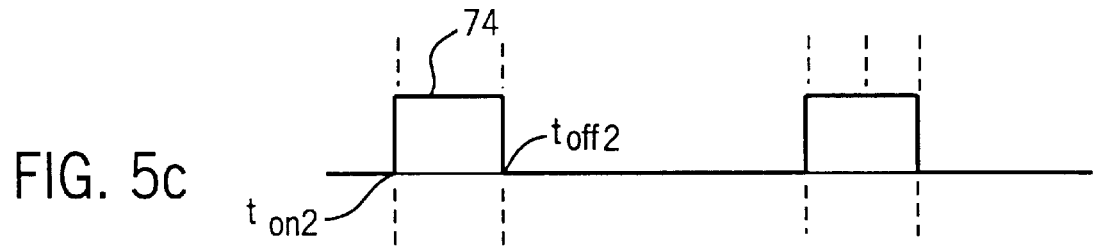

Referring also to FIGS. 5b and 5c an upper signal 72 and a lower signal 74 that control the upper and lower switches 12, 13, respectively, can be observed. The turn-on $t_{on1}$, $t_{on2}$ and turn-off $t_{off1}$, $t_{off2}$ times of the upper and lower signals 72, 74 come from the intersections of modulating signal 68 and carrier signal 67.

When signal 68 intersects carrier signal 67, signal 67 has a positive slope, the upper signal 72 goes off and the lower signal 74 goes on. On the other hand, when signal 68 intersects signal 67 while the carrier signal 67 has a negative slope, the upper signal 72 goes on and the lower signal 74 goes off.

Figure 4:
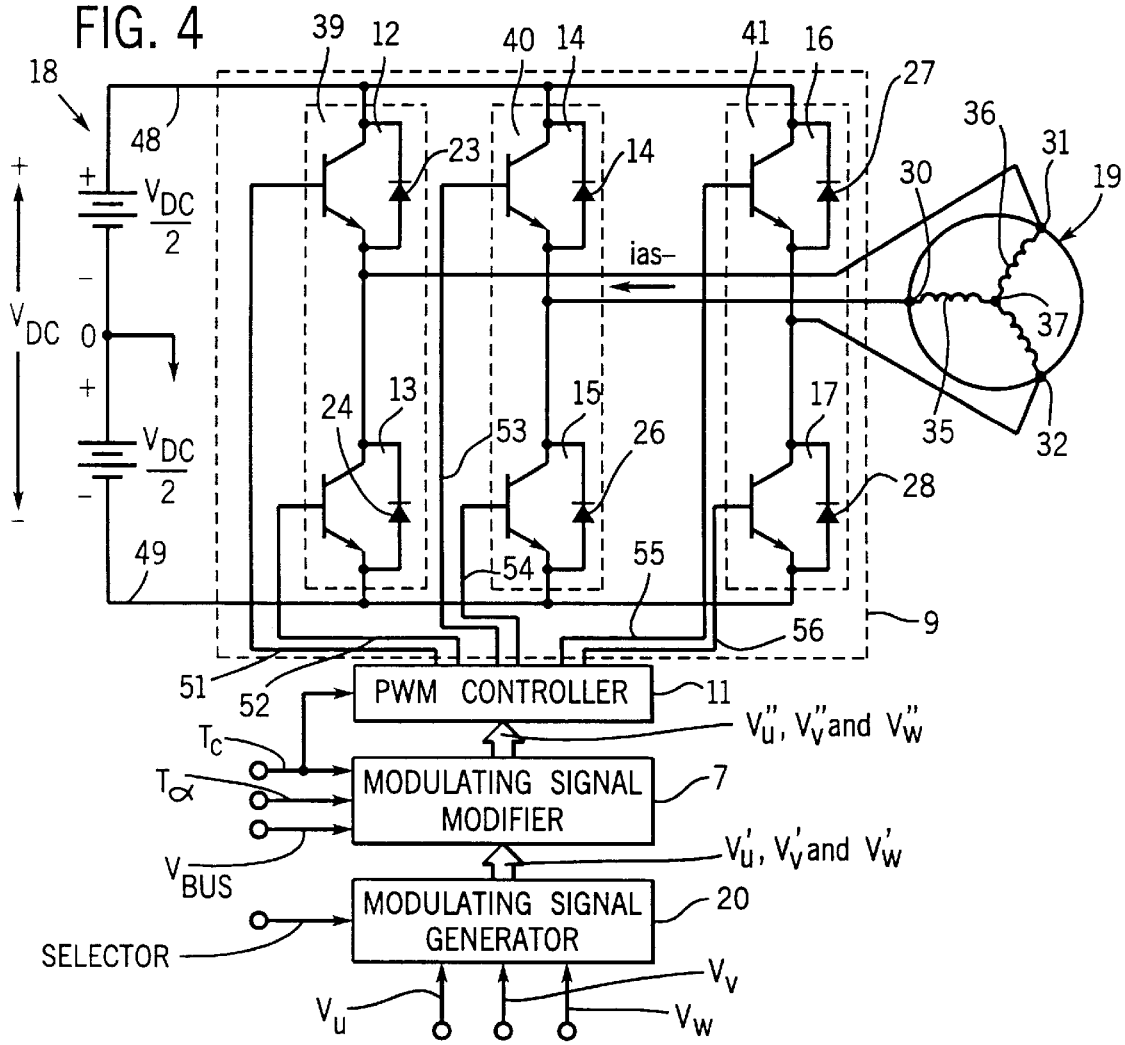
FIG. 4 is a schematic of an inventive motor controller.
Figure 5D:
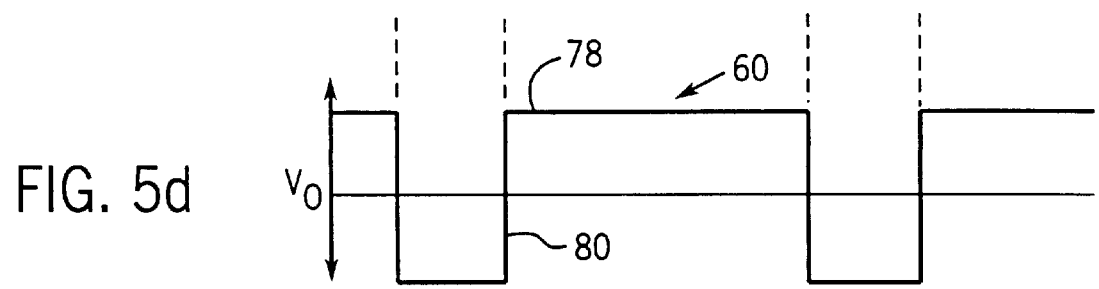
FIG. 5d is a graph illustrating a high frequency pulse generated by the firing pulses of FIGS. 5b and 5c.

Referring to FIGS. 4 and 5d, a high frequency voltage pulse 60 resulting from the upper and lower signals 72, 74 in FIGS. 5b and 5c that might be provided at terminal 31 is illustrated. When the upper signal 72 is on and the lower signal 74 is off, switching device 12 allows current to flow from the high voltage rail 48 to motor terminal 31 thus producing the positive phase 78 of pulse 60 at motor terminal 31. Ideally, when the upper signal 72 goes off and the lower signal 74 goes on, switching device 12 immediately turns off and switching device 13 immediately turns on connecting motor terminal 31 at the low voltage rail 49 producing the negative phase 80 of pulse 60 at motor terminal 31. As well known in the art, in reality, to eliminate a short between the positive and negative DC rails 48 and 49, a dead time or delay is introduced between the times when one switch turns off and an associated switch turns on. The high frequency voltage pulses average over a given period to produce a low frequency voltage at terminal 31. Ideally, the maximum amplitudes of the positive and negative phase portions 78, 80 of pulse 60 are plus or minus $V_{DC}/2$.

In reality, however, at high switching frequencies associated with IGBTs and other high speed devices, voltage reflection between the motor 19 and the inverter 9 can increase the magnitude of the terminal line-to-line (30–31, 31–32, 32–30) voltage to greater than three times the DC voltage when the upper signal 72 has certain characteristics.

To substantially eliminate the greater than twice bus voltage phenomenon, modifier 7 receives a modulating signal 68 from generator 20 and determines the characteristics of the modulating signal 68, compares those characteristics to characteristics known to cause greater than twice overvoltage and, when greater than twice overvoltage is likely, alters the modulating signal 68.

Referring to FIG. 5a, carrier signal 67 can be divided into carrier periods $T_c$ wherein each carrier period $T_c$ is the time between peak carrier signal values. During any carrier period $T_c$, the upper switch 12 will be on when the upper signal 72 is on and will be off during off periods $T_{off}$ on either side of the on-time $T_{on}$. Near the top and bottom portions of a modulating signal 68 where the modulating signal 68 becomes substantially horizontal, the off periods $T_{off}$ on either side of an on-time will be approximately identical. This is particularly true where the carrier frequency is much greater than the frequency of the reference signal as is the case in motor controls or in microprocessor drives.

Thus, during any carrier period $T_c$, when the signal generator 20 compares the carrier and modulating signals 67, 68 to generate firing signals, the resulting upper signal 72 has a characteristic on-time $T_{on}$ that is equal to the carrier period $T_c$ less two times an off period $T_{off}$.

Referring again to FIG. 1, the double pulse problem that creates greater than twice overvoltage occurs because the discharge or off-time $T_{off}$ of a signal (i.e. $V_i$ from $\tau_2$ to $\tau_4$) is insufficiently long to allow a motor voltage $V_m$ to reach a steady state DC value before the next PWM pulse ($V_i$) arrives at the end of the terminal. Therefore, each control system is characterized by a minimum upper switch off-time which is required to avoid double pulse greater than twice overvoltage.

Similarly, double pulse greater than twice overvoltage occurs when consecutive off-times are so large that an on time therebetween is to short to allow a motor voltage to reach a steady state DC value before the following off time. Thus, each system is also characterized by a maximum allowable upper switch off-time and an associated minimum required on time. The minimum required off-time and minimum required on time have the same duration which is referred to herein as a critical dwell time $T_\alpha$.

The present invention contemplates modifying modulating signal 68 (see FIG. 5a) in two different ways to eliminate the double pulse problem creating greater than twice overvoltage on the motor. A first way is to simply generate a modulating signal which eliminates turn-off periods and turn on periods when those periods have durations which are less than the critical dwell time $T_\alpha$. Turn off and turn on periods are eliminated by causing the modulating signal to exceed a peak carrier value during a carrier period. To this end, when a modulating signal is positive the signal can be set equal to a positive value and, when the modulating signal is negative the modulating signal can be set equal to a negative value.

A second way to eliminate double pulse greater than twice overvoltage is to generate a modulating signal which, when compared to the carrier signal via controller 11 (see FIG. 4) generates turn on and turn off times which have durations which are greater than or equal to the critical dwell time $T_\alpha$. By generating turn on and turn off times which are greater than or equal to time $T_\alpha$, resulting pulses allow motor voltage $V_m$ to reach a steady state prior to a change in signal $V_i$. The critical dwell time $T_\alpha$ can be assured by maintaining the magnitude of the modulating signal within a range of $\pm V_{T\alpha}^*$ where $V_{T\alpha}^*$ is a maximum voltage magnitude above which the turn on and turn off times are known to exceed the critical dwell time $T_\alpha$.

Figure 1:
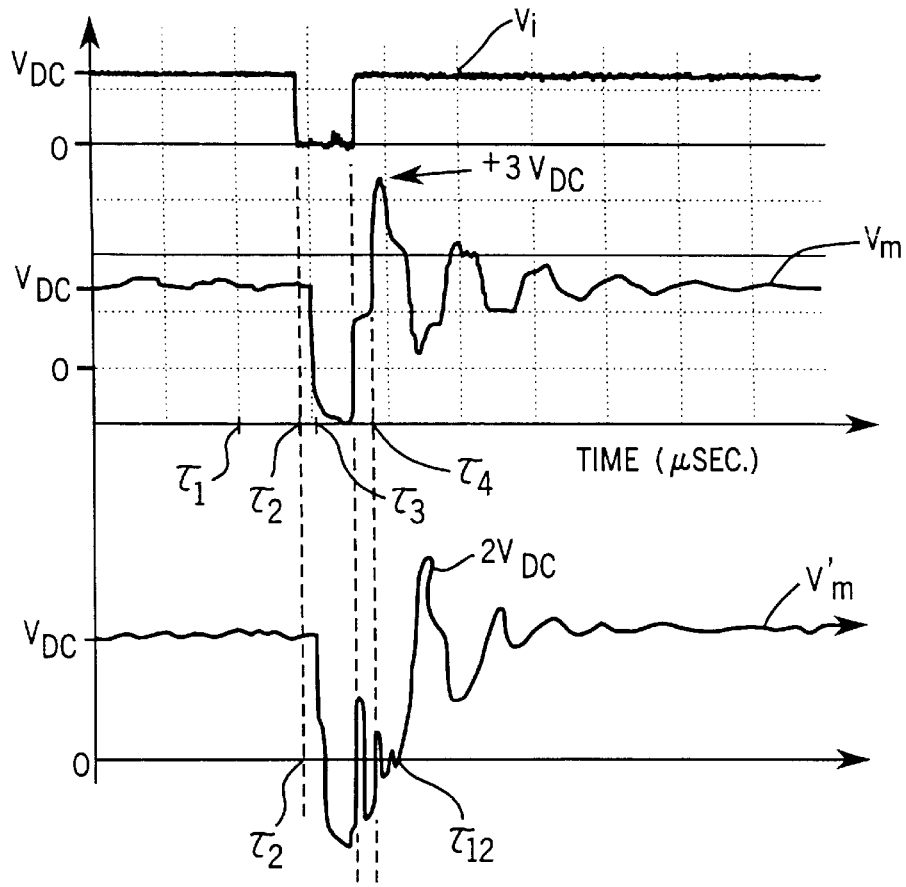
FIG. 1 is a graph that illustrates the greater than twice overvoltage phenomenon on the motor due to the inverter modulator double pulsing problem, an inverter line-to-line voltage generated by PWM firing signals, a resulting uncompensated line-to-line motor voltage of greater than twice voltage magnitude and a compensated line-to-line motor voltage limited to twice overvoltage by the described invention.

For example, referring still to FIG. 1, the bottom motor terminal voltage curve $V_m'$ was generated using a modified modulating signal wherein the signal magnitude was maintained below the maximum voltage magnitude during the period illustrated such that the resulting inverter voltage $V_i$ has an extended off-time (i.e. $\tau_2$ to $\tau_{12}$) on the order of 6–7μs instead of 4 μs. During the extended off-time, the motor terminal voltage $V_m{}'$ reaches an approximately zero steady state prior to time $\tau_{12}$ and prior to the next inverter voltage pulse reaching the terminal. As a result, the overvoltage level is reduced to a maximum value of 2 $V_{DC}$ instead of approximately 3 $V_{DC}$.

Figure 2:
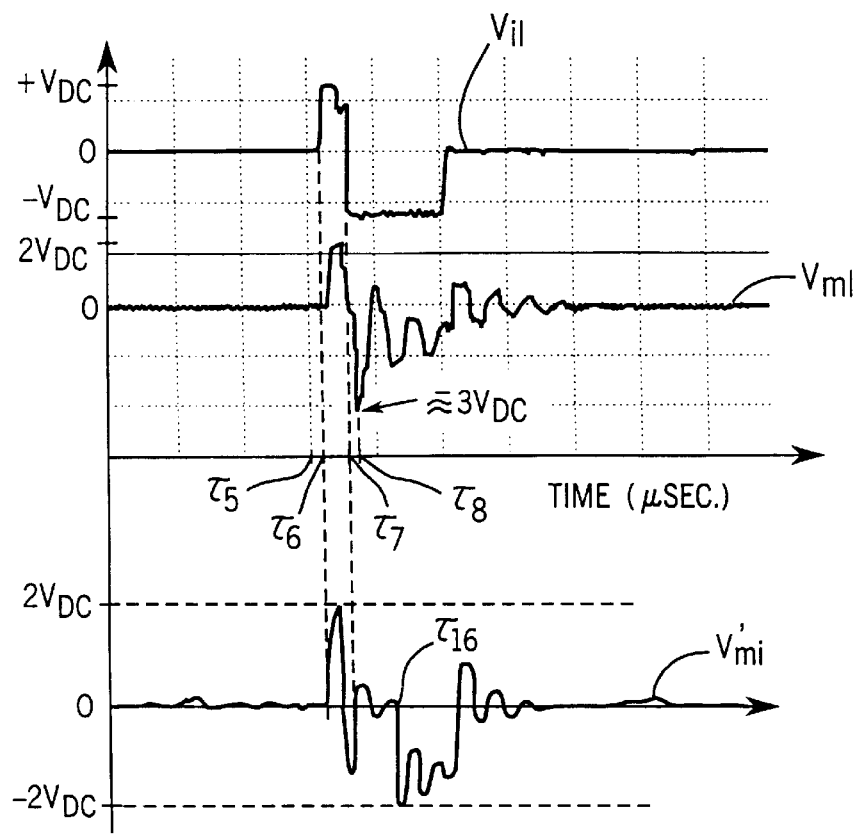
FIG. 2 is a graph that illustrates greater than twice overvoltage phenomenon on the motor due to the inverter modulated polarity reversal problem, FIG. 2 consists of an inverter line-to-line voltage generated by the PWM modulator firing signals, a resulting uncompensated line-to-line motor voltage of greater than twice voltage magnitude and a compensated line-to-line motor voltage limited to twice overvoltage by the invention.
Figure 3:
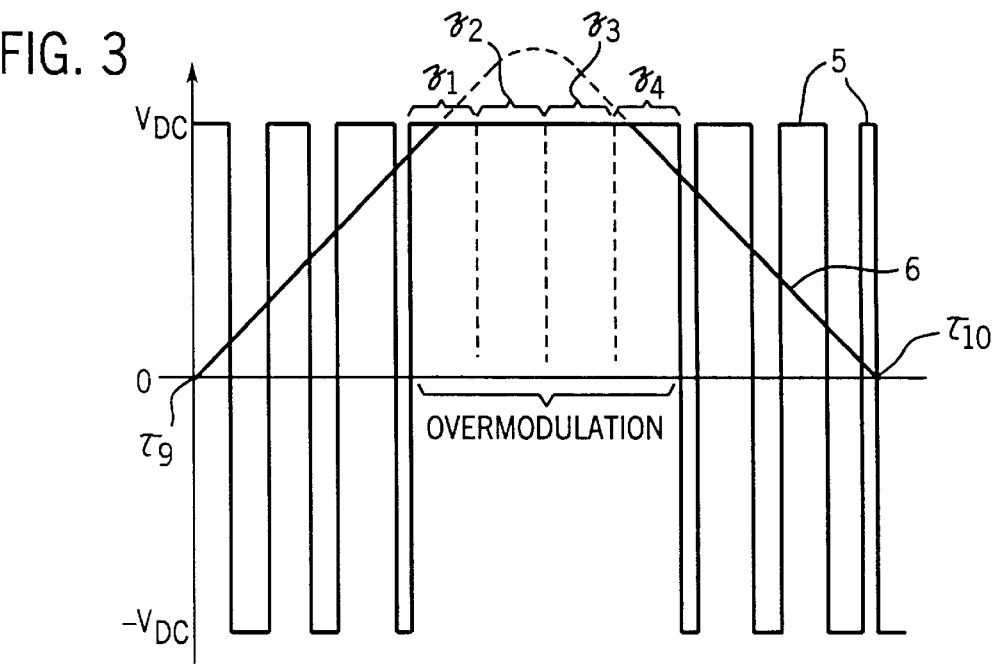
FIG. 3 is a graph illustrating the high frequency pulse width modulating voltage pulses and a resulting low frequency fundamental terminal voltage.
Figure 6A:
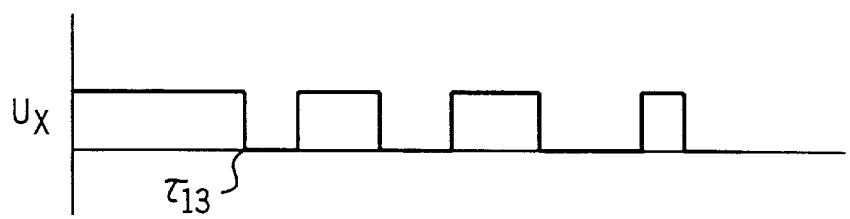
FIGS. 6a and 6b are graphs illustrating firing pulses for two different motor phases.
Figure 6B:
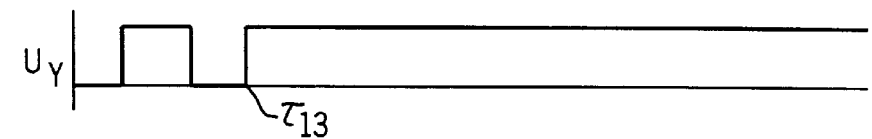
Figure 6C:
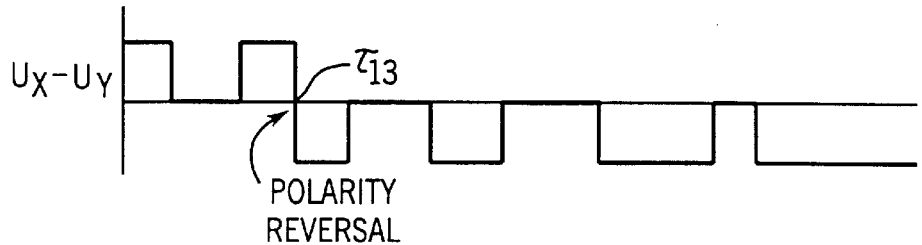
FIG. 6c is a graph illustrating the line-to-line voltage resulting from the firing pulses shown in FIGS. 6a and 6b.

In a similar fashion, polarity reversal greater than twice overvoltage can be substantially eliminated by modifying the modulating signal to alter the duration of switch on-times. overmodulating occurs when an unmodified modulating signal amplitude exceeds the peak carrier signal value such that during one or more carrier periods the switch states in a single phase remain unchanged (i.e. do not switch). Referring to FIGS. 6a and 6b, two upper firing signals $U_x$ and $U_y$ for two different upper switches (e.g. switches 12 and 14 in FIG. 4) can be observed. Firing signal $U_x$ in FIG. 6a comes out of, and firing signal $U_y$ goes into, overmodulation at time $\tau_{13}$. Therefore, in FIG. 6c, the line-to-line voltage $U_x$–$U_y$ has a polarity reversal at time $\tau_{13}$. Referring also to FIG. 2, polarity reversals like the one at time $\tau_{13}$ in FIG. 6c generate greater than twice overvoltage (see time $\tau_8$).

Figure 6D:
FIGS. 6d and 6e are similar to FIGS. 6a and 6b.
Figure 6E:
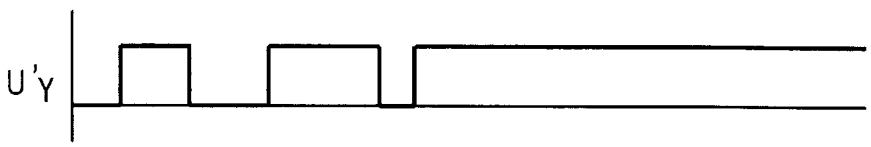
Figure 6F:
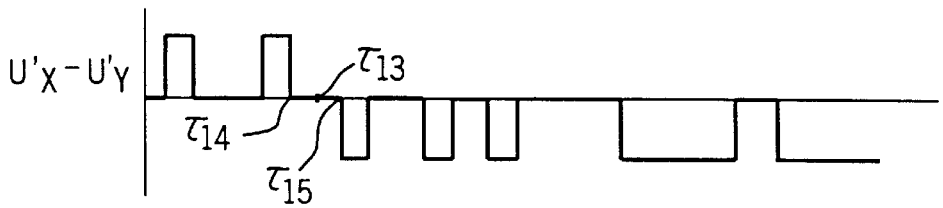
FIG. 6f is a graph illustrating the line-to-line voltage resulting from the firing pulses shown in FIGS. 6d and 6e.

Referring also to FIGS. 6d and 6e, two firing signals $U_x{}'$ and $U_y{}'$ generated by a modulating signal modified according to the present invention can be observed. The generated firing signals $U_x{}'$ and $U_y{}'$ are similar to signals $U_x$ and $U_y$ except that, during a carrier period just prior to coming out of overmodulation pulse $U_x{}'$ has the minimum allowable off-time (i.e. $T_\alpha$) and, during the carrier period just after going into overmodulation signal $U_y{}'$ has the minimum allowable off-time (i.e. $T_\alpha$). Referring also to FIG. 6f, the resulting line-to-line voltage $U_x{}'$–$U_y{}'$ has a period between times $\tau_{14}$ and $\tau_{15}$ during which the line-to-line voltage can substantially reach a steady state zero level prior to swinging from the positive to the negative DC rails.

Referring again to FIG. 2, the bottom motor terminal voltage curve $V_{ml}{}'$ is like the middle curve except that it represents line-to-line voltage where, upon going into and coming out of overmodulation, associated modulating signals are altered so that they produce firing signals like those illustrated in FIGS. 6d and 6e. As desired, the line-to-line voltage $V_{ml}{}'$ substantially reaches a steady state zero value by time $\tau_{16}$, when the line-to-line voltage is forced to the negative DC value.

To eliminate polarity reversal greater than twice overvoltage the modulating signal magnitude is simply maintained at the maximum voltage magnitude $V_{T\alpha}{}^*$ during periods when polarity reversal greater than twice overvoltage are likely to occur.

B. Dwell Time T, And Maximum Modulating Wave Magnitude

This section describes the methodology used to determine a critical dwell time $T_\alpha$ which is required to have a reflected wave voltage transient oscillation decay to zero before arrival of a next PWM pulse. Period $T_\alpha$ prevents greater than twice overvoltage applied to the motor. To this end, this section details how each cable length determines transient oscillation frequency which then determines cable AC resistance damping and time duration of the transient decay to zero.

In addition, this section describes how the critical dwell time can be used to determine a maximum modulating wave magnitude $V_{T\alpha}$ which can be achieved at a specific carrier frequency without causing greater than twice overvoltage.

FIG. 16 shows a single inverter generated voltage pulse $V_i$ of bus magnitude $V_{DC}$ traveling down two conductors of a bundled initially uncharged cable and a resulting motor terminal voltage $V_m$. Terminal voltage $V_m$ oscillations around $V_{DC}$ result once pulse $V_i$ reaches the motor terminals. Oscillation frequency at the terminals is solely determined by cable characteristics and independent of any drive or motor characteristics, including pulse rise time and horsepower size. The first oscillation has a theoretical peak of 2 $V_{DC}$ and a theoretical minimum of zero voltage. Successive oscillations have smaller peak voltage excursions around $V_{DC}$ due either to cable resistance damping or reflection coefficient mismatch occurring at both drive and motor ends. Cable resistance does modify wave velocity, but only slightly, so lossless line models to estimate oscillation frequency $f_0$ are essentially valid.

Pulse $V_i$ travels over the drive to motor cable length distance a during cable propagation time $t_p$ in FIG. 16. All points in the pulse envelope travel at the same velocity v and pulse shape is propagated without distortion down the line. Velocity v can be expressed according to the Equation:

$$v = \frac{\partial x}{\partial t} \pm \frac{1}{\sqrt{L_o C_o}} = \frac{1}{\sqrt{\mu \varepsilon}} = \frac{c}{\sqrt{\varepsilon_r}} \quad \text{Eq. 4}$$

where c is the speed of light, $L_0$ is cables inductance per unit length, $C_0$ is cable capacitance per unit length, $\mu$ is the permeability and $\epsilon_r$ is the permitivity of the dielectric material between conductors. The +/– sign of Equation 4 indicates that both forward and reverse waves travel at the same velocity. Wave propagation velocity is a function of cable inductance per unit length $L_0$ and cable capacitance per unit length $C_0$. Propagation velocity may also be defined using permeability $\mu$ and permitivity $\epsilon_r$ of the dielectric material between conductors. Substitution of free space constants $\mu = \mu_0 \mu_r$ and $\epsilon = \epsilon_0 \epsilon_r$ and setting $\mu_r = 1$ for cable insulations, results in v expressed as a function of relative dielectric constant $\epsilon_r$ and speed of light ($c = 3.0 \times 10^8$ m/s) as in Equation 4 above. Velocity v is measured at $1.524 \times 10^8$ m/s (50% of c) using $\partial x = a = 162$ m (500 ft) and measured $t_p$ of 1 μs from FIG. 16. Velocity v is also estimated at near 50% of c from Equation 4 using typical $\epsilon_r = 4.5$ for a three-conductor bundled PolyVinylChloride (PVC) insulated wire. Velocity v varies from a low of 32% c for Hypalon ($\epsilon_r \approx 9$–11) bundled wired to 70% c for Teflon ($\epsilon_r = 2.0$) bundled wires. Velocity v=c when widely separated conductors are used, since $\epsilon_r = 1.0$. The following analysis is valid for a typical case where IGBT voltage rise-time is equal to or less than cable propagation time $t_p$.

Pulse $V_i$ reaches the motor terminals at time period 1 in FIG. 16. An instantaneous transient overvoltage may occur if cable termination impedance $(Z_x)$ does not match cable surge impedance $Z_0$. In this case, impedance $Z_x$ is equal to a motor surge impedance $Z_m$. The amount of mismatch is defined by reflection coefficient $\Gamma_x$ according to the following Equation:

$$\Gamma_x = \frac{z_x - z_0}{z_x + z_0} \quad \text{Eq. 5}$$

where $Z_x$ is either $Z_m$ or $Z_i$ (inverter termination impedance), depending on the direction of wave propagation. Typical $Z_m$ and $Z_0$ magnitudes for drives up to 500 hp result in motor reflection coefficients $\Gamma_m$ being 0.95 for small hp motors, 0.9 for 50 hp motors, 0.82 for 125 hp motors and 0.65 for 500 hp motors. Peak overvoltage for the first oscillation is close to 2 $V_{DC}$ as shown in FIG. 16 for small motors and can be expressed as:

$$V_{line-line(pk)} = V_{DC} + V_{DC}\Gamma_m \qquad \text{Eq. 6}$$

Capacitance $C_o$ stays charged during periods 1 and 2. A $V_{DC}\Gamma_m$ reflected wave $V_{i1}$ propagates with velocity v back to the inverter in one period $t_p$ and with a polarity equal to the positive incident pulse, since coefficient $\Gamma_m$ is always positive. At the start of period 2, the incident reflected wave reaches the inverter output. Inverter freewheeling diodes conduct the reflected pulse into and out of a DC bus capacitor bank (not illustrated). The bus capacitor bank is an equivalent short circuit to the fast rising pulse so that cable termination $Z_x$ appears as a short circuit between phase conductors and no voltage rise at the inverter output in FIG. 16 is seen. At the inverter, $Z_x$ is zero and inverter reflection coefficient $\Gamma_i$ is $-1$ from Equation 5. Thus a reflected voltage pulse propagates back from the inverter with a magnitude equal to the incident signal one but of opposite polarity since $\Gamma_i = -1$. The incident negative polarity reflected wave reaches the motor after one period $t_p$ where again motor-cable surge impedance mismatch is defines by $\Gamma_m$. Instantaneous reflected wave voltage $V_{i2}$ at the motor is $([V_{i1}\Gamma_i]\cdot\Gamma_m)$. Motor line-to-line terminal voltage at the start of period 3 is the sum of $V_i$, $V_{i1}$, and incident $V_{i2}$ reflected waves. Thus, a theoretical minimum terminal voltage of zero volts can be obtained for $\Gamma_i = -1$ and $\Gamma_m = 1$. A non-zero terminal voltage is obtained for typical $\Gamma_m$ values (e.g. $0.65 \leq \Gamma_m \leq 0.95$) and when the influence of cable damping is included. Negative polarity voltage wave $V_{i2}$ propagates back to the inverter during $t_p$ period 3. At the start of period 4, the inverter maintains negative $V_{i2}$ wave magnitude but reverses the polarity before it travels over cable distance a back to the motor. At the end of period 4, the positive polarity pulse is incident on the motor terminals and the cyclic periodic process is repeated. Cable length a is traversed 4 times during the cycle, each one taking one time interval $t_p$, so total time period $T_{cycle}$ between oscillations using $v = \partial X/\partial t$ is defined by Equation:

$$T_{cycle} = 4t_p = \frac{4a}{v} = 4a\sqrt{L_0 C_0} \qquad \text{Eq. 7}$$

so that the cable oscillating frequency is:

$$f_0 = \frac{1}{T_{cycle}} = \frac{1}{4t_p} = \frac{v}{4a} = \frac{1}{4a\sqrt{L_0 C_0}} \qquad \text{Eq. 8}$$

Cable oscillation time $T_{cycle}$ is linear and directly proportional to cable length a from Equation 7. Oscillation frequency is inversely proportional to cable length from Equation 8. Thus, high oscillation frequencies occur at short cable lengths.

Cable construction, insulation type and conductor spacing all determine cable parameters $L_0$ and $C_0$, which define cable wave velocity v (see Eq. 4). A bundled cable construction compared to widely separated conductors ($\epsilon_r = 1$) results in lower v from Equation 4 and thus a lower $f_0$ from Equation 8. The $\epsilon_r$ values of various wire insulation types also affect v, which is directly proportional to $f_0$ from Equation 8.

Cable oscillation frequency indirectly affects damping characteristics of the overvoltage transient due to conductor AC resistance being increased as a result of skin and proximity effects. Resistance losses produce a power loss in the forward PWM voltage pulse $V_i$, a resulting current pulse $I_i$, and the reflected wave pulses. The heat loss for an element of cable distance dx can be expressed as:

$$Pdx = \left[(I_i)^2 r_s + \frac{(V_i)^2}{r_p}\right]dx \qquad \text{Eq. 9}$$

where $r_s$ is the series conductor AC resistance ($\omega$/unit length) and $r_p$ is a cable parallel insulation resistance ($\omega$/unit length), a high ohmic value. Insulation losses can be neglected since the magnitude of $r_p$ is large.

Equation 10 defines the power in pulses that pass along a lossless line as equal to the product of energy content E and velocity of propagation v. Energy storage content is the sum of equal magnitude components, $\frac{1}{2} L_0 (I_i)^2$ and $\frac{1}{2} C_0 (V_i)^2$. Equation 10 is valid only if the resistances are so small that the lossless line relationship between voltage and current of Equation 11 is constant and not altered.

$$P = Ev[(V_i)^2 C_0]\left[\frac{1}{\sqrt{L_0 C_0}}\right] = \frac{(V_i)^2}{Z_0} \qquad \text{Eq. 10}$$

$$Z_0 = \frac{V_i}{I_i} = \sqrt{\frac{L_0}{C_0}} \qquad \text{Eq. 11}$$

The power loss of the pulse for each element of the line $(-P\ dx)$ is obtained by differentiating Equation 10. Equation 12 equates differentiated Equation 10 to the heat losses of Equation 9.

$$-(I_i)^2 r_s dx = -\left(\frac{V_i}{Z_0}\right)^2 r_s dx = \frac{-2V_i(dV_i)}{Z_0} \qquad \text{Eq. 12}$$

Separating variables x and $V_i$ to either side and integrating both sides of Equation 12 leads to a final damping Equation 13. The original pulse amplitude $V_o$ will be exponentially attenuated to its final pulse amplitude V at the end of the cable dependent only on cable constants $r_s$, $Z_0$ and cable distance x traveled.

$$\frac{V}{V_0} = \varepsilon^{-(r_s x/2Z_0)} = \varepsilon^{-(K_p K_{skin}(f_0) r_{dc} x/2Z_0)} \qquad \text{Eq. 13}$$

Thus, tightly bundled phase conductors have greater damping than widely separated conductors, since $Z_0$ of bundled cables is 8–150 $\omega$ and is 10 to 20 times lower than for separated conductors. Reflected waves traveling between drive and motor dampen quickly since distance (x=4a in meters) is traveled during each successive oscillation $T_{cycle}$. Also, damping is greater in lower HP drives since smaller gauge wires have higher dc resistance values in the $r_s$ term.

Resistance $r_s$ is dependent on the cable oscillation frequency $f_o$ and is increased above the DC value due to skin and proximity effects. Skin effect is due to the fact internal inductance of a conductor is highest at the center and least at the edges. Thus, high frequency current oscillating at $f_0$ tends to flow in the outer radius of a cable, decreasing the apparent conductor area and increasing AC resistance. Proximity effect is due to magnetic fields of a neighboring adjacent conductor distorting and effectively reducing current flow area in the primary conductor. Proximity effect increases AC resistance by a factor of two ($K_p = 2$) in Equation 13 for tightly bundled round conductor cables. The skin effect factor ($K_{skin(f0)}$) in Equation 18 is a function of frequency. Referring also to FIG. 17, under high frequency operation, only the shaded area. of conductor diameter $d_0$ is used. Depth of conductor current density penetration is denoted as $\gamma$ and an $A_{ac}$ conductor area is approximated assuming $\gamma \ll d_0$ and oscillating frequency $f_0$ while usable conductor area under DC conditions is denoted as $A_{dc}$ in the following Equation:

$$K_{skin(fx)} = \frac{R_{ac}}{R_{dc}} = \frac{\rho l / A_{ac}}{\rho l / A_{dc}} = \frac{A_{dc}}{A_{ac}} = \frac{A_0}{A_{ac}} = \frac{\pi d_0^2 / 4}{A_{ac}} \qquad \text{Eq. 14}$$

where:

$$A_{ac} = \frac{\pi}{4}[d_0^2 - (d_0 - 2\gamma)^2] = \pi[\gamma d_0 - \gamma^2]\pi\gamma d_0 \qquad \text{Eq. 15}$$

Skin depth of penetration $\delta$ is defined when conductor current density in the radial dimension is at the $\epsilon^{-1}$ value. Substitution of permeability $\mu$ and conductivity $\sigma$ for copper results in:

$$\delta = \frac{1}{\sqrt{\pi f_0 \mu \sigma}} \quad \text{where} \quad \delta_{cu} = \frac{0.0661}{\sqrt{f_0}} \text{ [m]} \qquad \text{Eq. 16}$$

The total amount of high frequency power carried by the conductor can be described by the Poynting Vector equation. Substitution of $\gamma = \delta_{cu}/2$ into Equations 14 and 15 yields an expression for the $K_{skin(f0)}$ factor:

$$K_{skin(f0)} = \frac{\pi d_0 / 4}{\pi d} = \frac{d_0}{2\delta} = \frac{d_0 \sqrt{f_0}}{2(0.0661)} \qquad \text{Eq. 17}$$

Equation 18 expresses solid wire copper conductor AC resistance $r_s$ as a function of cable oscillation frequency $f_0$ that includes skin and proximity effects.

$$r_s = \qquad \text{Eq. 18}$$

$$K_p K_{skin(f0)} R_{dc} = K_p \left( \frac{d_0 \sqrt{f_0}}{2(0.0661)} \right)\left( \frac{4\rho}{\pi d^2} \right) = \frac{K_p 16.61 * 10^{-8} \sqrt{f_0}}{d_0}$$

The time to damp reflected pulses to less than 5% of initial peak value is estimated by substituting $x = vt$, $v = 1/(L_0 C_0)^{0.5}$ and $Z_0 = (L_0/C_0)^{0.5}$ into Equation 13. Reflected wave overvoltages are damped out in a $3\tau$ time interval, with $\tau$=one time constant=$(2L_0/r_s)$. Thus,:

$$\frac{V}{V_o} = \varepsilon^{-(r_s x/2Z_0)} = \varepsilon^{-(r_s vt/2Z_0)} = \varepsilon^{-(r_s/2L_0)t} = \varepsilon^{-t/\tau} \qquad \text{Eq. 19}$$

FIG. 18 graphs calculated $3\tau$ times for bundled cables of various conductor gauges that include skin and proximity effect factors for $r_s$. A measured skin effect ($L_0$=91 nH/ft at $f_0$<1 Khz and 85 nH/ft at $f_0$>100 kHz) was used for all bundled cables. Measured $3\tau$ time from FIG. 16 is $\approx 20\,\mu s$ for 500 ft of 12 AWG bundled cable. Calculated $f_0$ oscillation frequency is 250 kHz while calculated $3\tau$ time from FIG. 18 is $\approx 18\,\mu s$.

FIG. 18 shows typical $3\tau$ damping times to reflected wave transients are between the solid lines corresponding to cable lengths of 1000 ft ($\approx fo=100$ kHz) and 100 ft ($\approx fo=1$ MHz). The chart shows skin effect AC resistance has a larger influence on damping the reflected transients as compared to the 60 Hz resistance. The chart also shows the shorter the cable, the higher the oscillating frequency $f_0$ from Eq. 8 and the greater the damping effect from the cable resistance. It is critical to have the reflected wave overvoltage transient oscillation decay to zero before the arrival of the next PWM pulse. This prevents trapped line charge from causing a possible 3 pu overvoltage transient when PWM dwell times (the time when the line-to-line voltage is zero) are short or if carrier frequency is increased, thus reducing allowable decay times.

Low HP AC drives have a $\Gamma_m \approx 1$ and small wire gauges so that the predominant mechanism of transient overvoltage decay is through skin effect cable resistance damping. High HP AC drives have large cable diameters. So overvoltage transient decay from skin effect cable resistance damping in FIG. 18 is minimal. Luckily, these drives have reduced cable to motor reflector coefficients $\Gamma_m$ (e.g. <0.9). Thus, the main damping of the reflected waves is obtained by multiplying the reflected wave by these reduced $\Gamma_m$ values at each successive $f_0$ cycle until the transient decays. The breakpoint between these two different decay modes is thought to be somewhere in the vicinity of drive HP's using #8 AWG wire.

Damping times $T\alpha$ were established for various cable types and lengths. To simplify application, a nominal cable length of 300 feet was selected and cable type was correlated with HP to establish $T\alpha$. This represents a reasonable compromise between commissioning simplification and performance.

FIG. 19 is a listing of times $T\alpha$ as a function of horse power for the recommended cables at each power level. Dwell times $T\alpha$ are listed in microseconds.

During a commissioning period prior to motor operation, a controller can be used to determine the critical dwell time $T\alpha$ for various HP and cable characteristics and a lookup table can be generated. To this end, referring to FIG. 22, a critical dwell time $T_\alpha$ identifier 498 is illustrated. Identifier 498 includes a microprocessor 500 and a memory unit 502. Processor 500 receives various combinations of inductance $L_0$ and resistance $r_s$ per unit length of supply line nd uses those values to determine the critical dwell time $T_\alpha$ (i.e. $3\tau$) for each combination as $3 \cdot (2L_0 r_s)$. Dwell times $T_\alpha$ are then correlated with inductance $L_0$ and resistance $r_s$ and stored in a memory unit 502 for later use during normal motor operation. Alternatively, as cable or supply line characteristics depend on motor horsepower, motor horse power can be correlated with specific inductance $L_0$ and resistance $r_s$ values and thereby correlated with a critical dwell time $T_\alpha$, providing a table in unit 502 similar to the table of FIG. 19.

After a controller is installed and prior to normal motor operation, an operator can then either provide motor horse-power or inductance $L_0$ and resistance $r_s$ values to processor 500 via an interface 496. Processor 500 then accesses table 502 and identifies a suitable critical dwell time $T_\alpha$ for use in identifying magnitude $V_{T\alpha}*$ as described below. Time $T_\alpha$ is provided via a bus 504 to modifier 7 (see FIG. 4).

To determine the maximum voltage magnitude, $V_{T\alpha}$, the critical dwell time $T_\alpha$ is used to identify a maximum on-time $T_{onmax}$ corresponding to the maximum period the upper switch can remain on during a carrier period while not in overmodulation without causing greater than twice overvoltage. The maximum on-time $T_{onmax}$ is:

$$T_{onmax} = T_c - T_\alpha \qquad \text{Eq. 20}$$

Referring again to FIG. 5a, a second equation for $T_{onmax}$ can be provided by studying carrier signal 67 and modulating signal 68. During any carrier period $T_c$, the upper switch 12 will be on for period $T_{on}$ according to the following Equation:

$$T_{on} = \frac{T_c}{2} + T_c \cdot \frac{V^*}{V_{bus}} \qquad \text{Eq. 21}$$

where V* is the modulating signal 68 and $V_{bus}$ is the DC bus voltage. Thus, where signal V* is zero, the on period during an associated carrier period $T_c$ is equal to $T_c/2$ or one half the carrier period $T_c$. Where signal V* is equal to $$\frac{-V_{bus}}{2}$$

(i.e.

$$\frac{-V_{DC}}{2}$$

which is the negative DC rail value), on period $T_{on}$ during the associated carrier period $T_c$ is zero. Similarly, when signal V* is equal to $$\frac{+V_{bus}}{2}$$

(i.e.

$$\frac{+V_{DC}}{2}$$

which is the positive DC rail value), on period $T_{on}$ is equal to the carrier period $T_c$ duration.

Setting Equations 20 and 21 equal to each other and solving for signal V* yields:

$$V^* = V^*_{T\alpha} = V_{bus} \cdot \left( \frac{1}{2} - \frac{T_\alpha}{T_c} \right) \qquad \text{Eq. 22}$$

Magnitude $V_{T\alpha}^*$ is the maximum modulating wave magnitude which can be achieved at a carrier frequency of $f_c$ (i.e. $1/T_c$) without causing greater than twice overvoltage and without eliminating PWM pulses. Clearly magnitude $V_{T\alpha}^*$ is dependent on carrier frequency $f_c$.

In motor controls several different types of modulating signals can be used to drive a motor. For example, the most common type of signal is a sine wave signal used in Sine Wave PWM (SPWM). Another type of signal is a third harmonic signal used in Third Harmonic PWM (TPWM). The TPWM signal is sinusoidal with a third harmonic injected therein. Another type of signal is a space vector signal used in Space Vector PWM (SVPWM). The SVPWM signal is similar to the TPWM signal but is generated in a different manner.

Yet another type of signal is a two-phase signal used in Two-Phase PWM (TPPWM). The TPPWM signal gets its name from the fact that at least one signal corresponding to one of three motor phases is tied to the positive or negative DC bus during motor operation and line-to-line voltage is controlled by altering signals corresponding to the other two phases.

The modulating signals can be divided into two types: "continuous" including SPWM, TPWM and SVPWM and "discontinuous" including TPPWM. "Discontinuous" means that at all times during operation, at least one motor phase is forced into overmodulation and switching associated with that phase stops or is "discontinuous". "Continuous" means that signals on all three phases are switched during each modulating signal half cycle.

As a result of having different signal forms, each of these types of modulating signals will produce double pulsing overvoltages at different fundamental output voltage levels. However, all occurrences regardless of modulating signal are initiated at the same $V_{T\alpha}^*$.

To illustrate the relationships between carrier frequency, type of modulating signal and magnitude $V_{T\alpha}^*$, it is instructive to solve Equation 22 for a per unit modulating voltage $M_{i(\alpha)}$. As well known, voltage $M_{i(\alpha)}$ can be expressed as:

$$M_{i(\alpha)} = \frac{V^*}{\frac{2V_{bus}}{\pi}} \qquad \text{Eq. 23}$$

Thus, both sides of Equation 22 can be multiplied by $\pi/2$ and the result can be solved for voltage $M_{i(\alpha)}$ such that:

$$M_{i(\alpha)} = \frac{V^*_{T\alpha}}{\frac{2V_{bus}}{\pi}} \geq \left( \frac{1}{2} - \frac{T_\alpha}{T_c} \right) \cdot \frac{\pi}{2} \qquad \text{Eq. 24}$$

Figure 7:
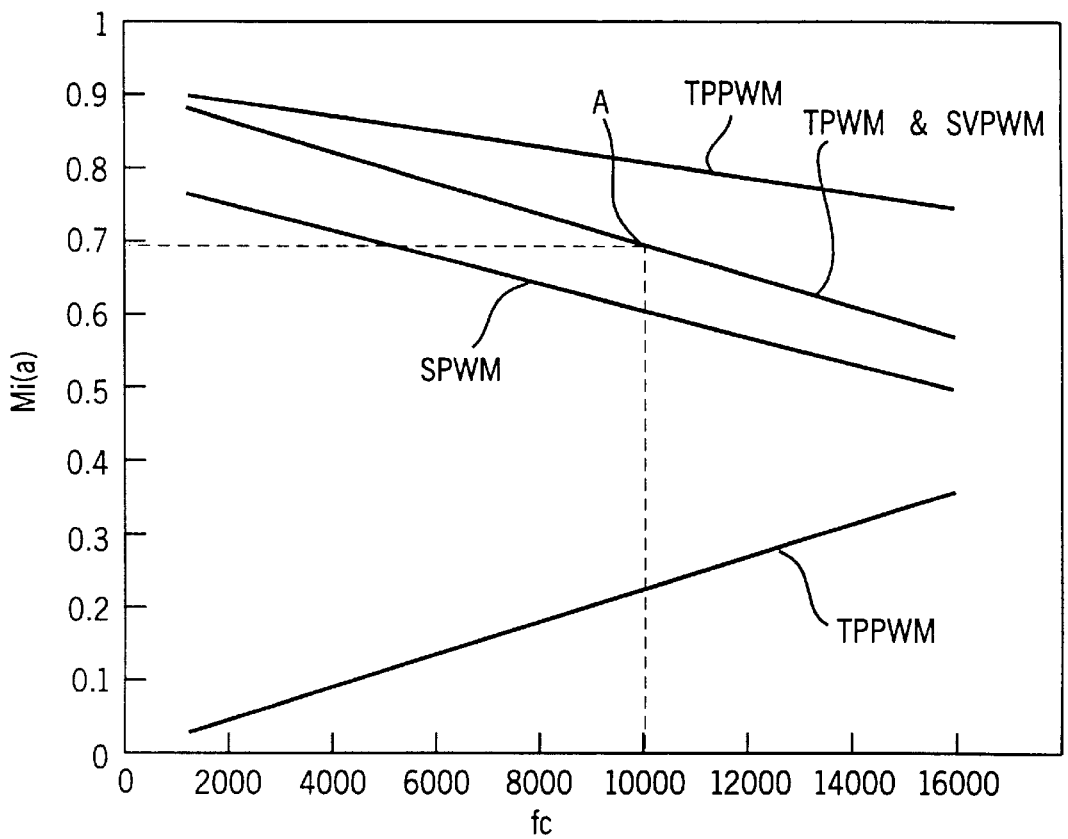
FIG. 7 is a graph illustrating the beginning of the greater than 2 p.u. motor terminal voltage for various types of modulating signals which can be used with the present invention.

Referring to FIG. 7, voltage $M_{i(\alpha)}$ is plotted as a function of carrier frequency $f_c$ with $T_\alpha = 12 \mu s$ for a sine wave signal (SPWM), a third harmonic signal (TPWM), a space vector signal (SVPWM) and a two phase signal (TPPWM). For each continuous modulating signal type there is one voltage curve. For the discontinuous modulating signal TPPWM there are two curves that correspond to magnitudes $V_{T\alpha}^*$. At a given carrier frequency for the continuous modulators, when voltage $M_{i(\alpha)}$ is below a curve, a modulating signal V* is below the maximum voltage magnitude $V_{T\alpha}^*$ and greater than twice overvoltage probably will not occur. However, above a curve, signal V* exceeds magnitude $V_{T\alpha}^*$ and greater than twice overvoltage is likely. For example, referring specifically to the SVPWM curve, at a carrier period of 100 $\mu s$ voltage $M_{i(\alpha)}$ at which V* exceeds $V_{T\alpha}^*$ is approximately 0.69 (see point A). Thus, above $M_{i(\alpha)}=0.69$, $T_{off}$ is greater than $T_\alpha$ and greater than twice overvoltage occurs and below $M_{i(\alpha)}=0.69$, $T_{off}$ is less than $T_\alpha$ and greater than twice overvoltage probably will not occur. Clearly, at any given frequency $f_c$ the magnitude $V_{T\alpha}^*$ and hence voltage $M_{i(\alpha)}$ depends on which type of modulating signal is used. Also, clearly, in general as carrier frequency $f_c$ is increased, the voltage $M_{i(\alpha)}$ at which greater than twice overvoltage will occur decreases. This can be intuitively understood by referring again to FIGS. 5a and 5b. In FIG. 5a, as carrier frequency $f_c$ is increased period $T_c$ decreases. In FIG. 5b, as period $T_c$ decreases the off time $T_{off}$ for a given modulating wave 68 decreases and double pulsing becomes more likely.

Referring again to FIG. 4, modifier 7 receives carrier period $T_c$, period $T_\alpha$ and a signal indicative of bus voltage $V_{bus}$ and determines maximum voltage magnitude $V_{T\alpha}^*$ according to Equation 22 above. Once magnitude $V_{T\alpha}^*$ has been determined, it can be used to determine when the modulating signal must be modified in order to avoid greater than twice overvoltage.

Modifier 7 compares a modulating signal 68 (FIG. 5a) to magnitude $V_{T\alpha}^*$ and when magnitude $V_{T\alpha}^*$ exceeded, modifies signal 68 by either setting signal 68 equal to $$\frac{+V_{DC}}{2}$$

or maintaining signal 68 at magnitude $V_{T\alpha}*$. When signal 68 is set equal to $$\frac{+V_{DC}}{2},$$

PWM pulses are eliminated and so is the possibility of greater than twice overvoltage due to double pulsing. When signal 68 is maintained at $V_{T\alpha}*$, turnoff and turn on times of the upper switch are at least equal to critical dwell time $T_\alpha$ and greater than twice overvoltage due to both double pulsing and polarity reversal are eliminated.

Preferably, modifier 7 is incorporated into a microprocessor (not shown) of a motor controller wherein the microprocessor steps through a software program to alter modulating wave signals as required. However, it should be understood that the present invention is also meant to contemplate other hardware configurations capable of stepping through the inventive methods.

The present invention includes three different methods for substantially limiting greater than twice overvoltage. A first method, referred to herein as the Pulse Elimination Technique (PET), operates to increase modulating signal 68 to equal either the positive or negative DC bus value $$\left(\frac{\pm V_{DC}}{2}\right)$$

when the magnitude of signal 68 exceeds maximum voltage magnitude $V_{T\alpha}*$. When signal 68 is positive and its magnitude is greater than magnitude $V_{T\alpha}*$, signal 68 is set equal to $$\frac{+V_{DC}}{2}.$$

When signal 68 is negative and its magnitude is greater than magnitude $V_{T\alpha}*$, signal 68 is set equal to $$\frac{-V_{DC}}{2}.$$

Thus, according to the PET method during all overvoltage periods the modulating signal is equated to either the positive or negative $$\frac{V_{DC}}{2}$$

supply rail.

A second method, referred to herein as the Maximum-Minimum Pulse Technique (MMPT), operates by maintaining signal 68 at magnitude $+V_{T\alpha}*$ during carrier periods when modulating signal 68 is greater than $V_{T\alpha}*$ and maintaining signal 68 at $-V_{T\alpha}*$ during carrier periods when signal 68 is less than $-V_{T\alpha}*$. In this way, MMPT provides sufficient off times and on times to allow the motor voltage to decay thereby preventing greater than twice overvoltage.

A third method, referred to as the hybrid method, which is a combination of the PET and MMPT methods, operates by maintaining signal 68 at magnitude $V_{T\alpha}*$ during a first predefined number N of carrier cycles and during a last predefined number N of carrier cycles (i.e., porches) of the period when the modulating signal exceeds $V_{T\alpha}*$. Between the porches, the method operates like the PET method to set a modulating signal to the positive or negative $$\frac{V_{DC}}{2}$$

supply rail.

C. Hardware

Figure 9:
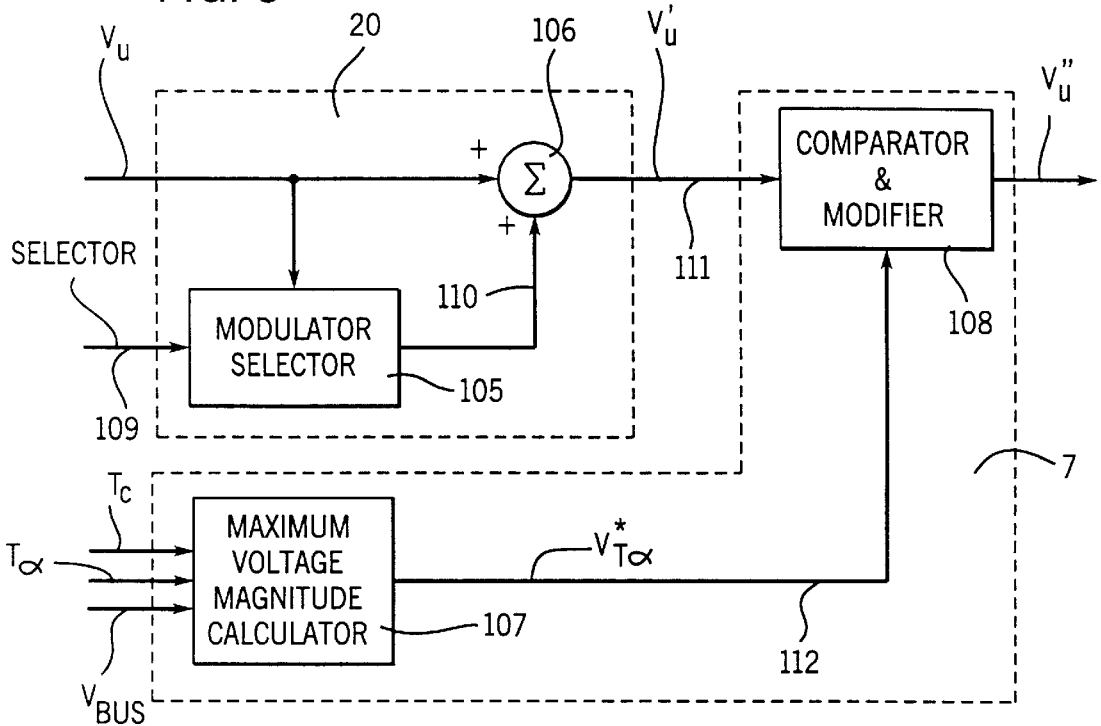
FIG. 9 is a schematic of hardware according to the present invention.

Hardware for the MMPT, PET and hybrid methods is essentially the same. Referring to FIGS. 4 and 9, modifier 7 and generator 20 components associated with leg 39 are illustrated. Similar components are provided for each of legs 40 and 41 which, in the interest of simplification, will not be described here in detail as they operate in the same manner as components associated with leg 39.

Generator 20 receives three modulation signals $V_u$, $V_v$ and $V_w$ and a selector signal and provides three modified signals $V_u'$, $V_v'$ and $V_w'$ to modifier 7. Modifier 7 receives signals $V_u'$, $V_v'$ and $V_w'$ modifies those signals when overvoltage periods occur, and provides output modulating signals $V_u''$, $V_v''$ and $V_w''$.

Generator 20 components associated with leg 39 include a modulator selector 105 and a summer 106. Modifier 7 components include a maximum voltage magnitude calculator 107 and a comparator and modifier 108.

Selector 105 is a module which can be used to alter modulation technique. For example, selector 105 can be used to cause SPWM, SVPWM, TPWM or TPPWM or other types of modulation. To this end a selector input 109 is provided which allows either an operator or some automatic control mechanism to alter modulation technique to suit instantaneous needs. After the modulation technique is selected, selector 105 generates a modifier signal on line 110 which, when added to modulating signal $V_u'$, generates either an SVPWM, SPWM, TPWM, or TPPWM signal $V_u'$. To this end the signal on line 110 is added to signal $V_u$ by summer 106 and signal $V_u'$ is output on line 111. Typically, signal $V_u'$ would be provided to PWM controller 11 for comparison to the carrier signal.

According to the present invention, however, signal $V_u'$ is provided to module 108 for comparison to magnitude $V_{T\alpha}*$ and modification when required to eliminate greater than twice overvoltage.

Referring still to FIG. 9, calculator 107 receives carrier period $T_c$, critical dwell time $T_\alpha$ and a signal $V_{bus}$ indicative of the bus voltage and determines magnitude $V_{T\alpha}*$ according to Equation 6. Magnitude $V_{T\alpha}*$ is provided to module 108 via line 112. Module 108 implements either the MMPT, PET or hybrid method as described in detail in the following three sections.

Figure 11B:
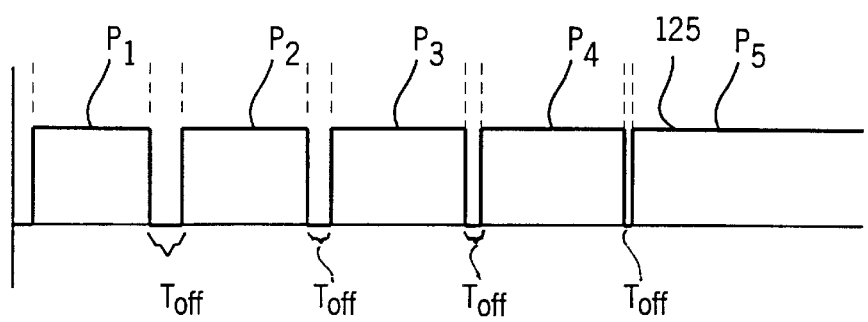
Figure 13A:
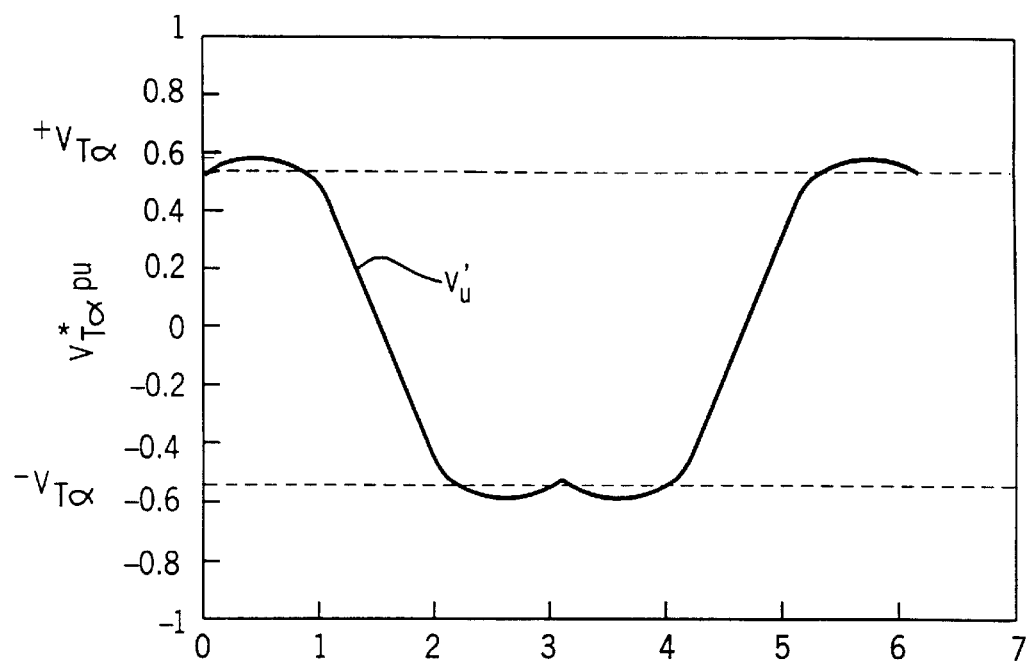
FIG. 13a is a graph illustrating an unmodified space vector modulating signal.

Referring to FIG. 13a, for comparison purposes an SVPWM modulating signal $V_u'$ which has not been modified according to the present invention, is illustrated. Clearly signal $V_u'$ is periodic and has both positive and negative half cycles. Referring also to FIG. 11a, a small section of signal $V_u'$ is illustrated along with a typical carrier signal 67. FIG. 11b illustrates an upper switch firing signal 125 generated by controller 11 (FIG. 4) when signals 67 and $V_u'$ are compared. Signal 125 includes firing pulses $P_1$, $P_2$, $P_3$, $P_4$ and $P_5$ which correspond to carrier periods $T_{c1}$, $T_{c2}$, $T_{c3}$, $T_{c4}$ and $T_{c5}$, respectively. Magnitude $V_{T\alpha}*$ is marked on FIG. 11a indicating the voltage magnitude which signal $V_u'$ cannot exceed without causing greater than twice overvoltage. Signal $V_u'$ intersects magnitude $V_{T\alpha}^*$ at time $\tau_{16}$. The off period $T_{off}$ between pulses $P_1$ and $P_2$ is prior to time $\tau_{16}$ and therefore that off period is greater than dwell time $T_\alpha$ and the sequence of pulses $P_1$ and $P_2$ will not cause double pulse greater than twice overvoltage. However, the off periods $T_{off}$ between pulses $P_2$ and $P_3$, $P_3$ and $P_4$, and $P_4$ and $P_5$ are all after time $\tau_{16}$ when signal $V_u'$ exceeds magnitude $V_{T\alpha}^*$ and therefore those off periods $T_{off}$ are less than time $T_\alpha$ and the sequence $P_2$, $P_3$, $P_4$ and $P_5$ will generate several instances of greater than twice overvoltage.

D. Techniques

1. Pulse Elimination Technique (PET)

The PET method will be described in the context of the flow chart shown in FIG. 10. In accordance with the PET method, at decision block 120 module 108 first determines whether or not an overvoltage period is occurring. To this end, during a carrier period, module 108 determines if signal $V_u'$ exceeds or is equal to magnitude $V_{T\alpha}^*$.

When signal $V_u'$ is less than magnitude $V_{T\alpha}^*$, an overvoltage period is not occurring and control passes to block 121 where module 108 sets its output signal $V_u''$ equal to its input signal $V_u'$. When signal $V_u'$ is greater than or equal to $V_{T\alpha}^*$, control passes to decision block 122.

At block 122 module 108 determines if signal $V_u'$ is positive or negative. Where signal $V_u'$ is positive, module 108 control passes to block 124 and signal $V_u''$ is set equal to positive DC voltage $$\frac{+V_{DC}}{2}.$$

Where signal $V_u'$ is negative, module 108 control passes to block 125 and signal $V_u''$ is set equal to negative DC voltage $$\frac{-V_{DC}}{2}.$$

Figure 12A:
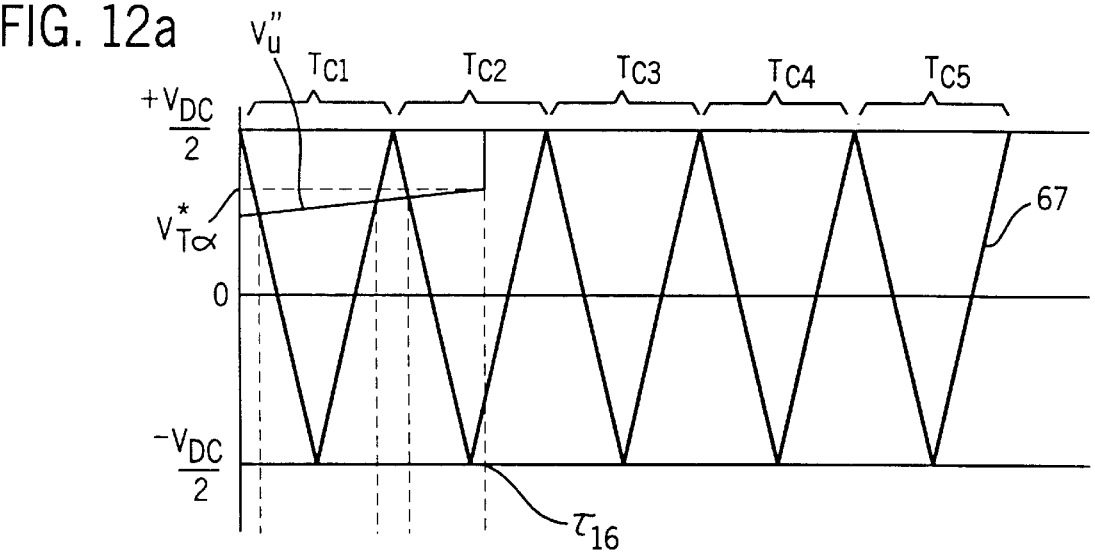
FIG. 12a is similar to FIG. 11a except that the modulation signal has been modified according to the method of FIG. 10
Figure 12B:
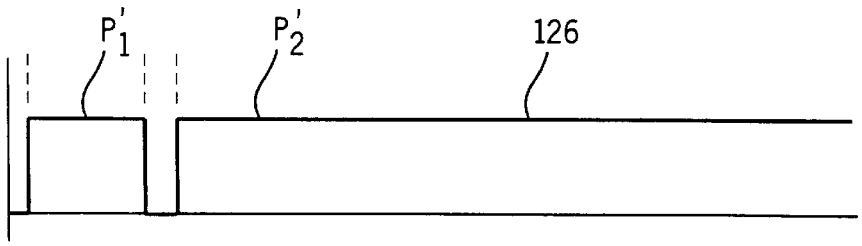

Referring also to FIGS. 12a and 12b, FIG. 12a is like FIG. 11a except that the modulating signal has been modified according to the PET method and is identified as $V_u''$. FIG. 12b illustrates an upper switch firing signal 126 generated by controller 11 (FIG. 4) when signals 67 and $V_u''$ are compared. Signal 126 includes firing pulses $P_1'$ during period $T_{c1}$ and $P_2'$ during periods $T_{c2}$ on. During first carrier period $T_{c1}$, signal $V_u'$ is less than magnitude $V_{T\alpha}^*$. In this case, control passes from block 120 to block 121 and signal $V_u''$ is set equal to $V_u'$. Thus, signal 126 is not altered during period $T_{c1}$ and pulse $P_1'$ is identical to pulse $P_1$ (FIG. 11a). However, at time $\tau_{16}$ during second carrier period $T_{c2}$, signal $V_u'$ reaches a level equal to magnitude $V_{T\alpha}^*$. At time $\tau_{16}$ module 108 control passes to block 122. At block 122 module 108 determines that signal $V_u'$ is positive. Thus control passes to block 124 and signal $V_u''$ is set to $$\frac{+V_{DC}}{2}.$$

Referring to FIGS. 11a and 12a, during carrier periods $T_{c3}$, $T_{c4}$ and $T_{c5}$, signal $V_u'$ remains greater than magnitude $V_{T\alpha}^*$ and therefore module 108 maintains signal $V_u''$ equal to $$\frac{+V_{DC}}{2}.$$

Thus, referring also to FIG. 12b, at the end of second period $T_{c2}$ and during periods $T_{c3}$ through $T_{c5}$, signal $V_u''$ does not intersect signal 67 and therefore upper switch firing signal 126 remains high during those periods and pulse $P_2'$ results. Comparing firing signal 126 (FIG. 12b) and unmodified signal 126 (FIG. 11b), clearly the pulses which cause greater than twice overvoltage (i.e. pulses between $T_{c2}$ and $T_{c3}$, $T_{c3}$ and $T_{c4}$, and $T_{c4}$ and $T_{c5}$) have been eliminated.

Referring again to FIG. 13a, eventually signal $V_u'$ again dips below magnitude $V_{T\alpha}^*$ on its way down to a negative half cycle and comes out of the overvoltage period. At that point, although not illustrated, in FIG. 10 control again passes through blocks 120 and 121 and output signal $V_u''$ is set equal to input signal $V_u'$.

Figure 10:
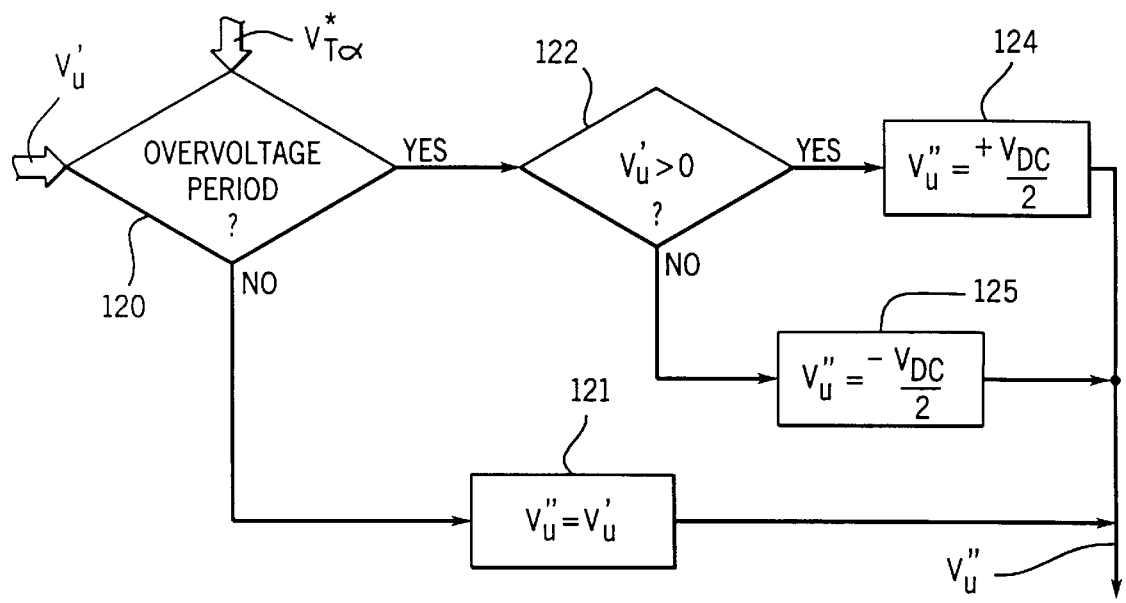
FIG. 10 is a flow chart illustrating a preferred inventive method.
Figure 13B:
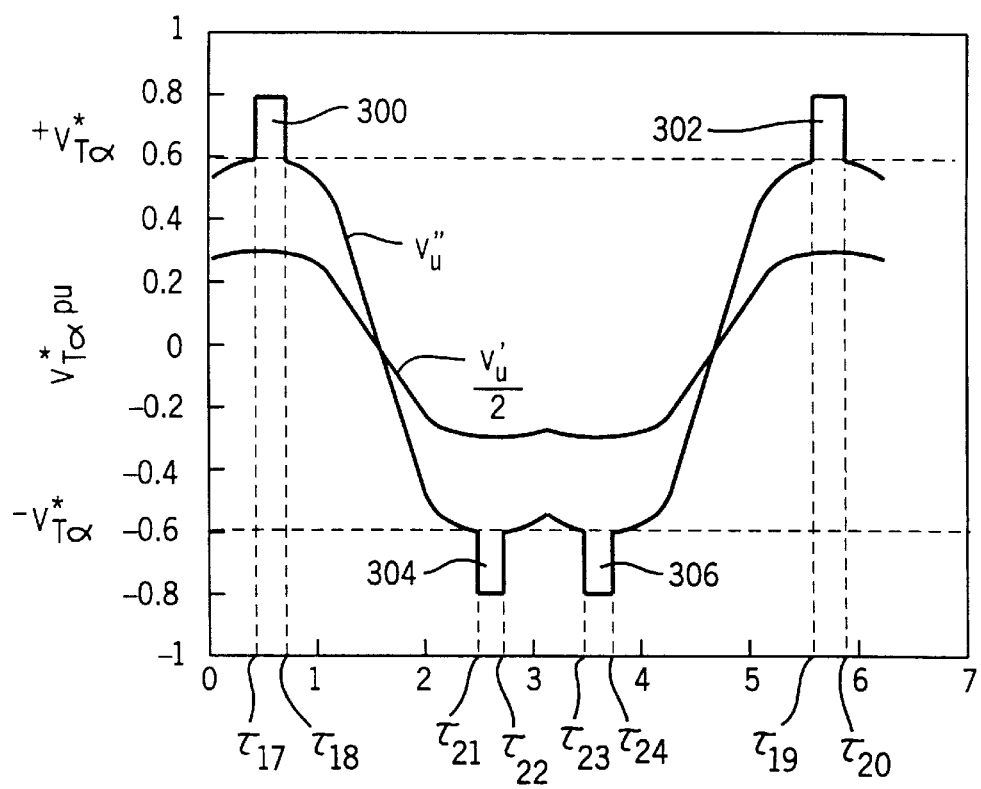
FIG. 13b is a graph illustrating both an unmodified modulation signal and a modulating signal modified in accordance with the method of FIG. 10.

Referring now to FIG. 13b, both the unmodified signal $V_u'$ and a signal $V_u''$ which has been modified according to the PET method of FIG. 10 are illustrated. Signal $V_u'$ has been divided by 2 so that the signals are clearly recognizable. In this example, magnitude $V_{T\alpha}^*$ is assumed to be at a level such that voltage $M_{i(\alpha)}$ is approximately 0.59. In addition, it is assumed signal $V_u'$ is approximately 0.61 so that signal $V_u'$ is slightly greater than magnitude $V_{T\alpha}^*$.

Graphically between times $\tau_{17}$ and $\tau_{18}$ signal $V_u''$ forms a post 300. In FIG. 13b, signal $V_u'$ exceeds magnitude $V_{T\alpha}^*$ at time $\tau_{17}$ and then drops below magnitude $V_{T\alpha}^*$ at time $\tau_{18}$. Thus, between times $\tau_{17}$ and $\tau_{18}$ signal $V_u'$ is modified to provide signal $V_u''$ which is set equal to $$\frac{+V_{DC}}{2}.$$

Similarly, during the next positive half cycle of signal $V_u''$, signal $V_u'$ exceeds magnitude $V_{T\alpha}^*$ between times $\tau_{19}$ and $\tau_{20}$ and therefore between times $\tau_{19}$ and $\tau_{20}$ signal $V_u'$ is again modified providing $V_u''$ which includes another post 302.

In addition, during the negative half cycle illustrated, between times $\tau_{21}$ and $\tau_{22}$ and between times $\tau_{23}$ and $\tau_{24}$, the magnitude of signal $V_u'$ exceeds magnitude $V_{T\alpha}^*$. Thus, between $\tau_{21}$ and $\tau_{22}$ and between $\tau_{23}$ and $\tau_{24}$, signal $V_u'$ is modified by setting $V_u'$ equal to $$\frac{-V_{DC}}{2}$$

forming posts 304 and 306. In this manner, greater than twice overvoltage due to double pulsing is substantially eliminated.

One problem with this PET method is that it can substantially increase inverter output voltage supplied to a load. For example, referring to FIG. 12b, each time the on-time of the firing signal 126 is increased to $$\frac{+V_{DC}}{2},$$

the average output voltage is increased. Furthermore, the resulting modulating signal increases the harmonic distortion by increasing the inter-carrier harmonics. Another problem with the PET method is that it does not eliminate polarity reversals.

2. Minimum, Maximum Pulse Technique (MMPT)

The MMPT method will be described in the context of the flow chart shown in FIG. 20. In accordance with the MMPT method, at decision block 420, module 108 first determines whether or not an overvoltage period is occurring. To this end, during a carrier period, module 108 determines if signal $V_u'$ exceeds or is equal to magnitude $V_{T\alpha}^*$. When signal $V_u'$ is less than magnitude $V_{T\alpha}^*$, an overvoltage period is not occurring and control passes to block 421 where module 108 sets its output signal $V_u''$ equal to its input signal $V_u'$. When signal $V_u''$ is greater than or equal to $V_{T\alpha}^*$, control passes to decision block 422.

At block 422, module 108 determines if signal $V_u'$ is positive or negative. Where signal $V_u'$ is positive, module 108 control passes to block 424 and signal $V_u''$ is set equal to $V_{T\alpha}^*$. Where signal $V_u'$ is negative, module 108 control passes to block 425 and signal $V_u''$ is set equal to $-V_{T\alpha}^*$.

Referring also to FIGS. 21a and 21b, FIG. 21a is like FIG. 11a except that the modulating signal has been modified according to the MMPT method and is identified as $V_u''$. FIG. 21a illustrates and upper switch firing signal 426 generated by controller 11 (FIG. 4) when signal 67 and signal $V_u''$ are compared. Signal 426 includes firing pulses $P_1'''$ through $P_5'''$ during periods $T_{c1}$ through $T_{c5}$. During first carrier period $T_{c1}$, signal $V_u'$ is less than magnitude $V_{T\alpha}^*$. In this case, control passes from block 420 to block 421 and signal $V_u''$ is set equal to $V_u'$. Thus, signal 426 is not altered during period $T_{c1}$ and pulse $P_1'''$ is identical to pulse $P_1$ (see FIG. 11a) However, at time $\tau_{34}$ during second carrier period $T_{c2}$, signal $V_u'$ reaches a level equal to magnitude $V_{T\alpha}^*$. At time $\tau_{34}$, module 108 control passes to block 422 where module 108 determines that signal $V_u'$, is positive. Thus, control passes to block 424 and signal $V_u''$ is set equal to $V_{T\alpha}^*$.

Referring to FIGS. 11a and 21a, during carrier periods $T_{c3}$, $T_{c4}$, and $T_{c5}$, signal $V_u'$ remains greater than magnitude $V_{T\alpha}^*$ and therefore module 108 maintains signal $V_u''$ equal to magnitude $V_{T\alpha}^*$. Thus, referring also to FIG. 21b, during periods $T_{c3}$ through $T_{c5}$, signal $V_u''$ intersects signal 67 as indicated and upper switch firing signal 426 generates pulses as illustrated. Comparing firing signal 426 (FIG. 21b) an unmodified signal 126 (see FIG. 11b), clearly the pulses which cause greater than twice overvoltage in signal 126 have been altered so that dwell times between pulses in signal 426 are greater than or equal to the critical dwell time $T_\alpha$.

Figure 13C:
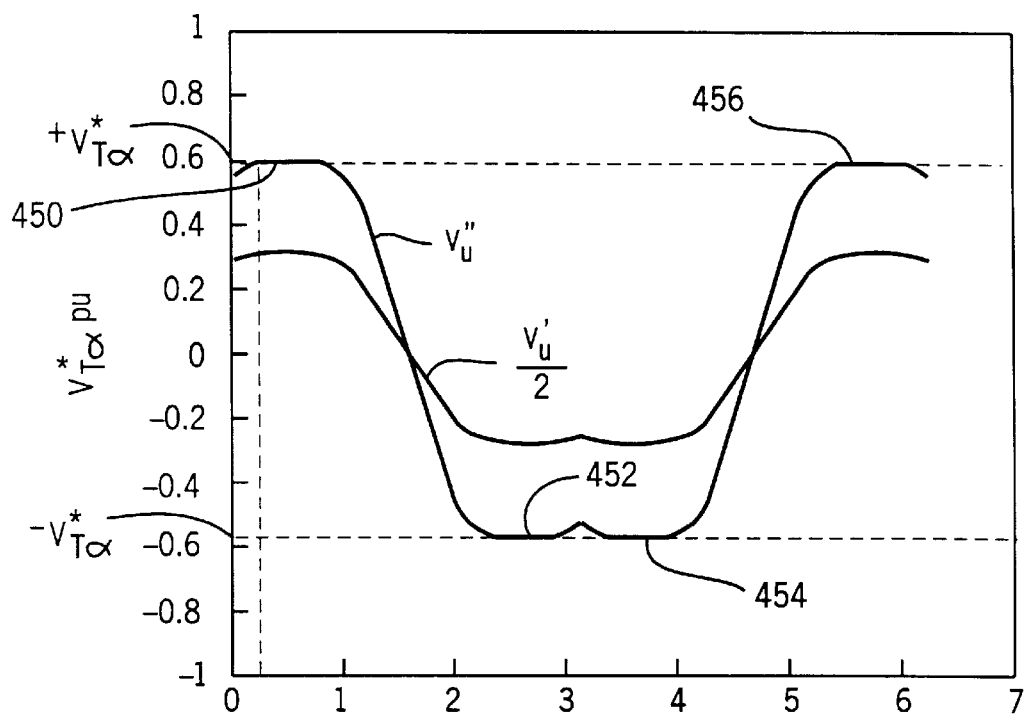
FIG. 13c is like FIG. 13b albeit corresponding to the method of FIG. 20
Figure 13D:
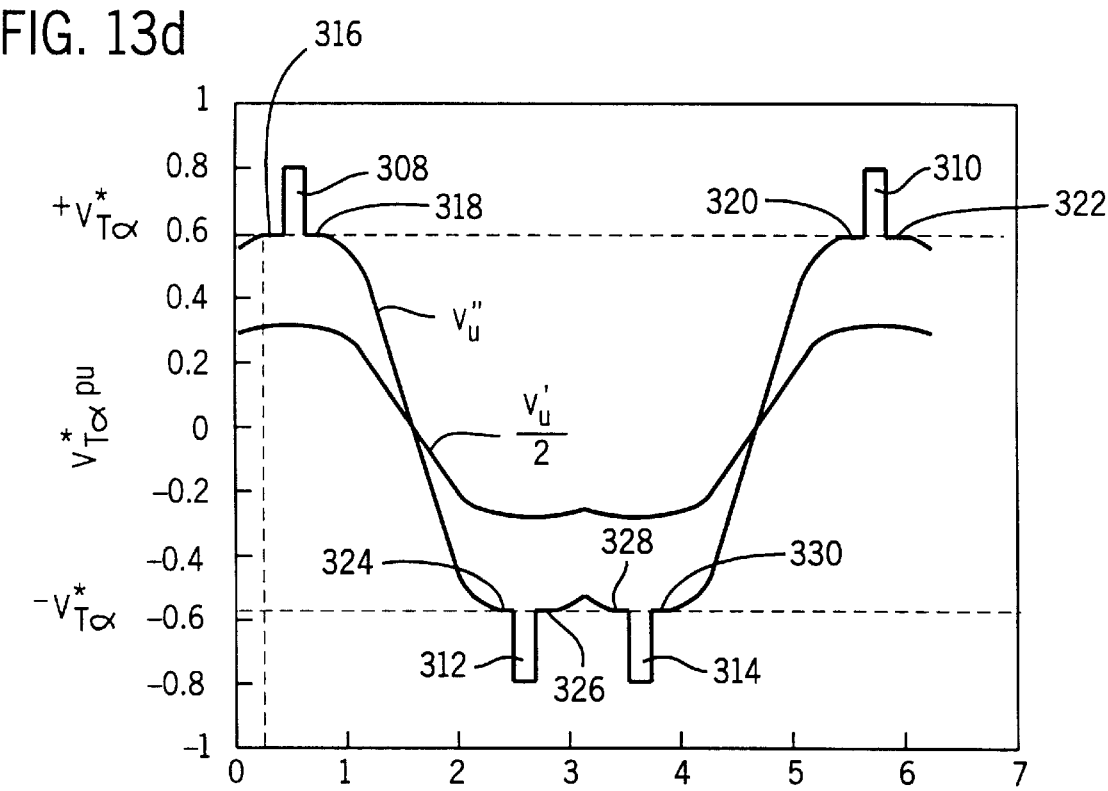
FIG. 13d is like FIG. 13b albeit corresponding to the method of FIG. 14.

Referring now to FIG. 13c, both an unmodified signal $V_u'$ and a signal $V_u''$ which has been modified according to the MMPT method of FIG. 20 are illustrated. Signal $V_u'$ has been divided by two so that the signals are clearly recognizable. In this example, magnitude $V_{T\alpha}^*$ is assumed to be at a level such that voltage $M_{i(\alpha)}$ is approximately 0.59. In addition, it is assumed signal $V_u'$ is approximately 0.61 so that signal $V_u'$ is slightly greater than magnitude $V_{T\alpha}^*$.

Graphically, signal $V_u''$ is similar to signal $V_u'$ except that each time the magnitude of $V_u'$ exceeds magnitude $V_{T\alpha}^*$, signal $V_u''$ is tied to magnitude $V_{T\alpha}^*$ resulting in plateaus in signal $V_u''$ indicated by numerals 450, 452, 454, and 456.

3. Hybrid a. N Value

N is a number selected by a system cesigner to ensure that polarity reversal greater than twice overvoltage will not occur. For example, in a three phase system, ideally modulation signals are precisely 120° out of phase so that at the precise instant when one firing signal is going into overmodulaticn, another signal is coming out. In this case, referring again to FIG. 6c, the firing signals of the two phases need only by altered during the first carrier period of overmodulation to eliminate polarity reversal.

In reality, however, modulating signals are often misaligned. Therefore, while two modulating signals might ideally be going into and coming out of overmodulation at the same time, in reality the two occurrences might take place separated by a few degrees. In this case, instead of occurring during an expected carrier period, the polarity reversal could occur during a subsequent carrier period, typically one or two periods later than expected.

To eliminate the possibility of polarity reversal due to modulating signals that are not separated by a sufficient dwell time, according to the PET method, each modulating signal is altered during a porch period consisting of the first few (i.e. N) carrier periods of each overvoltage period such that polarity reversal greater than twice overvoltage will not occur. To this end, during the first N carrier periods of an overvoltage period, a modulating signal is maintained at $V_{T\alpha}^*$ thus limiting the minimum and maximum off times of the firing signals. A typical N value will be on the order of 1 to 5.

It should be obvious to one of ordinary skill in the art that the value of N affects the magnitude of output voltage such that, a greater N value results in a reduced output voltage. Therefore, it is desirable to choose the lowest possible value of N that will eliminate polarity reversal so that adverse effects on output voltage are reduced.

While some systems according to the present invention may operate with a single high value for N calculated to ensure elimination of polarity reversal, preferably modifier 7 is provided with circuitry to alter value N as a function of the bus voltage level.

Overmodulation occurs naturally more frequently when the bus voltage drops below a nominal value. For example, a typical nominal bus voltage value may be 625 V DC. The occurrence of polarity reversals increases as overmodulation increases. Thus, when the bus voltage is above the nominal value (e.g. 625 V), the N value can be smaller than when the bus voltage is less than the nominal value.

For the purposes of this explanation, it will be assumed that when the bus voltage is greater than 625 V an N value of 1 will eliminate polarity reversal and that when the bus voltage is less than 625 V the N value should be 3 to eliminate polarity reversal. To eliminate N value changes on the fringe, preferably a 5 V hysteresis loop is provided between N value changes.

Figure 8:
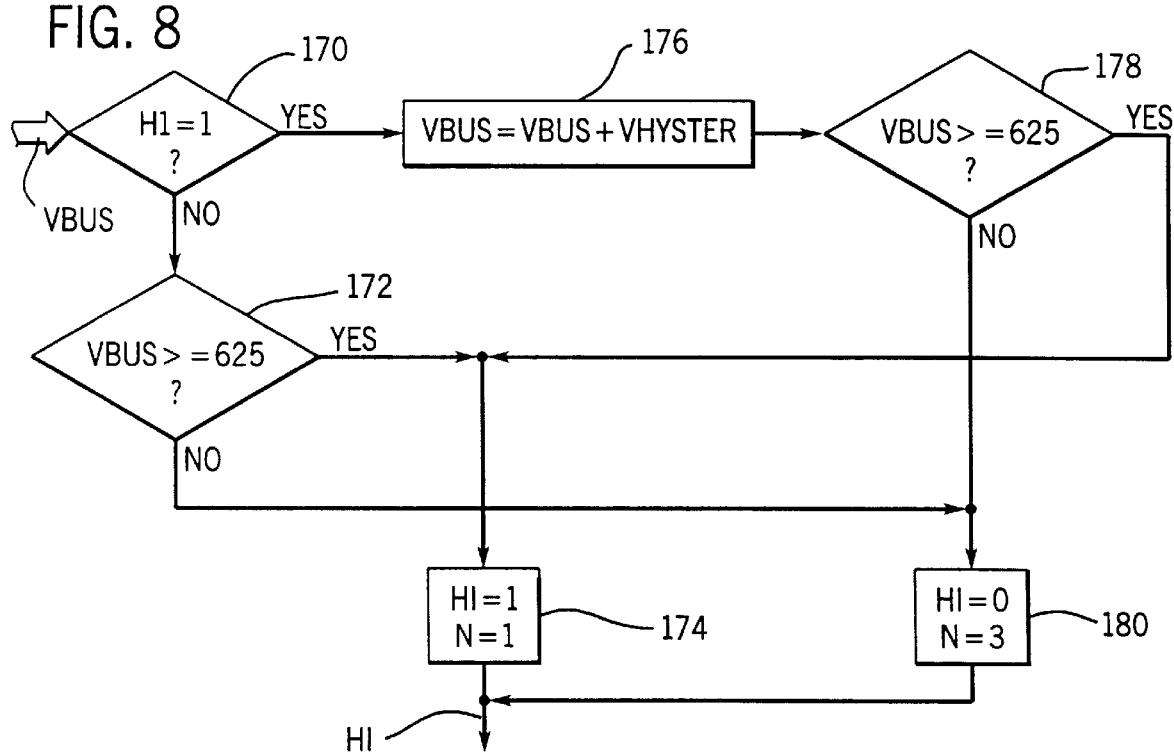
FIG. 8 is a flow chart showing a method used to determine the value of a variable N used in the methods of FIGS. 9 and 14.

According to the present invention the N value can be altered according to the method identified in FIG. 8. In FIG. 8, a flag H1 is initially set to zero. The compensator 7 receives the bus voltage $V_{bus}$ and at block 170, determines if flag H1 is equal to 1. Because flag H1 is zero initially, control passes to decision block 172 where modifier 7 determines if the bus voltage $V_{bus}$ is equal to or greater than the nominal 625 V value.

Assuming an initial bus voltage of 630 V, the likelihood of polarity reversal is low arid control passes to block 174 where flag H1 is set to 1 and N is set to 1.

The next time through the method in FIG. 8, at block 170 flag H1 is equal to 1 and control passes to block 176 where the bus voltage is increased by the 5 V hysteresis voltage $V_{hyster}$ prior to comparison to the nominal 625 V value at block 178. Assuming that the bus voltage is still 630 V, control again passes to block 174 where H1 is set to 1 and N is set to 1.

At some point, if the bus voltage $V_{bus}$ drops below the nominal 625 V value less the hysteresis voltage $V_{hyster}$, flag H1 is set to zero and N to 3. For example, assuming the bus voltage $V_{bus}$ instantaneously drops to 600 V, the next time through the method of FIG. 8, flag H1 is still 1 so control passes to block 176. At block 176, $V_{bus}$ (600 V) is added to $V_{hyster}$ (5 V) for a total of 605 V. At block 178, $V_{bus}$ is less than the nominal 625 V voltage and control passes to block 180. At block 180 the compensator 7 sets H1 to zero and N to 3.

The next time through the method of FIG. 8, flag H1 is zero and control passes to block 172 for comparison to the nominal 625 V voltage. Assuming the bus voltage $V_{bus}$ is still 600 V, control then passes to block 180 where H1 and N are reset to 0 and 3 respectively.

In this way, the modulating signals are modified during the first N carrier periods of overmodulation on each phase so that, two phases are never transitioning into and out of overmodulation at the same time and therefore, polarity reversal greater than twice overvoltage is eliminated. In addition, the method of FIG. 8 maintains the output voltage at the commanded voltage.

To maintain the fundamental terminal. voltage each modulating signal is always symmetrically altered. Thus, as the first N carrier cycles of each overvoltage period are maintained at $V_{T\alpha}*$, so too are the last N cycles of each compensation period.

b. Technique

The hybrid method will be described in the context of the flow chart shown in FIG. 14 and with reference to FIGS. 15a and 15b.

Figure 15A:
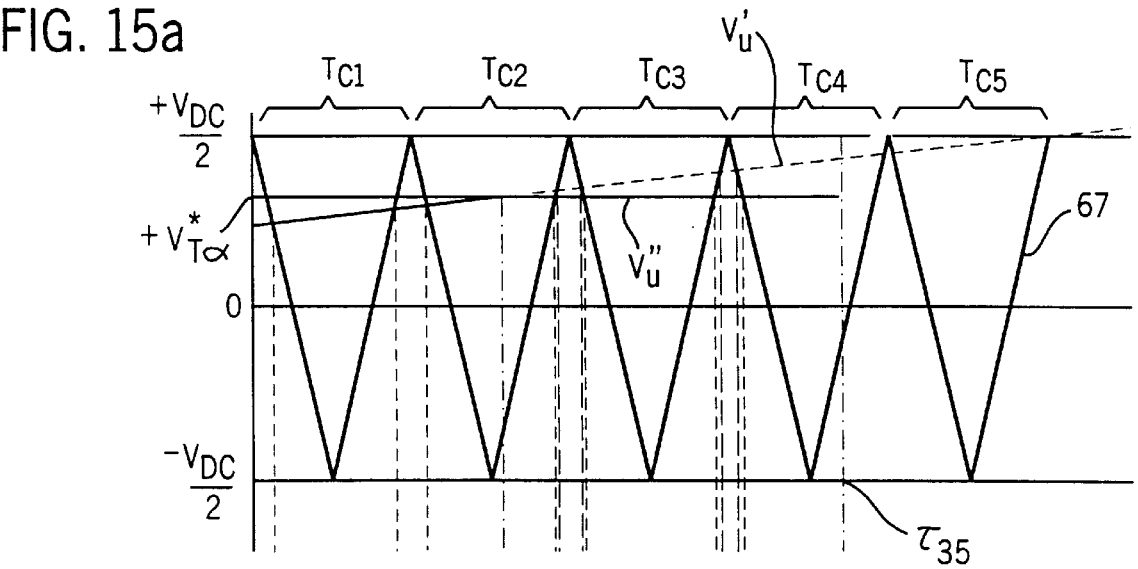
FIG. 15A is similar to FIG. 11a except that the modulation signal has been modified according to the method of FIG. 14

FIG. 15a is like FIG. 11a except that it includes a modulating signal $V_u''$ which has been modified in accordance with the hybrid method. FIG. 15b illustrates an upper switch firing signal 127 generated by controller 11 when carrier signal 67 and signal $V_u''$ are compared. Signal 127 includes firing pulses $P_1''$, $P_2''$, $P_3''$ and $P_4''$ which correspond to period $T_{c1}$, $T_{c2}$, $T_{c3}$ and $T_{c4}$ on.

For the purposes of modifying modulating signals to control turn off and turn on times of resulting firing pulses during specific carrier periods, the turn on or turn off time associated with a specific carrier period will be the time at the end of the specific carrier period which extends into the following carrier period. For example, referring still to FIG. 15a, the turn off time which will be affected by the modulating signal magnitude during first carrier period $T_{c1}$ will be between pulses $P_1''$ and $P_2''$. In other words, if signal $V_u'$ exceeds magnitude $V_{T\alpha}*$ during period $T_{c1}$, signal $V_u'$ will be modified such that the off time between $P_1''$ and $P_2''$ is altered. Similarly, the turn off time affected by the signal magnitude during period $T_{c2}$ will be between pulses $P_2''$ and $P_3''$, the turn off time affected by the signal magnitude during period $T_{c3}$ will be between pulses $P_3''$ and $P_4''$ and so on.

Figure 14:
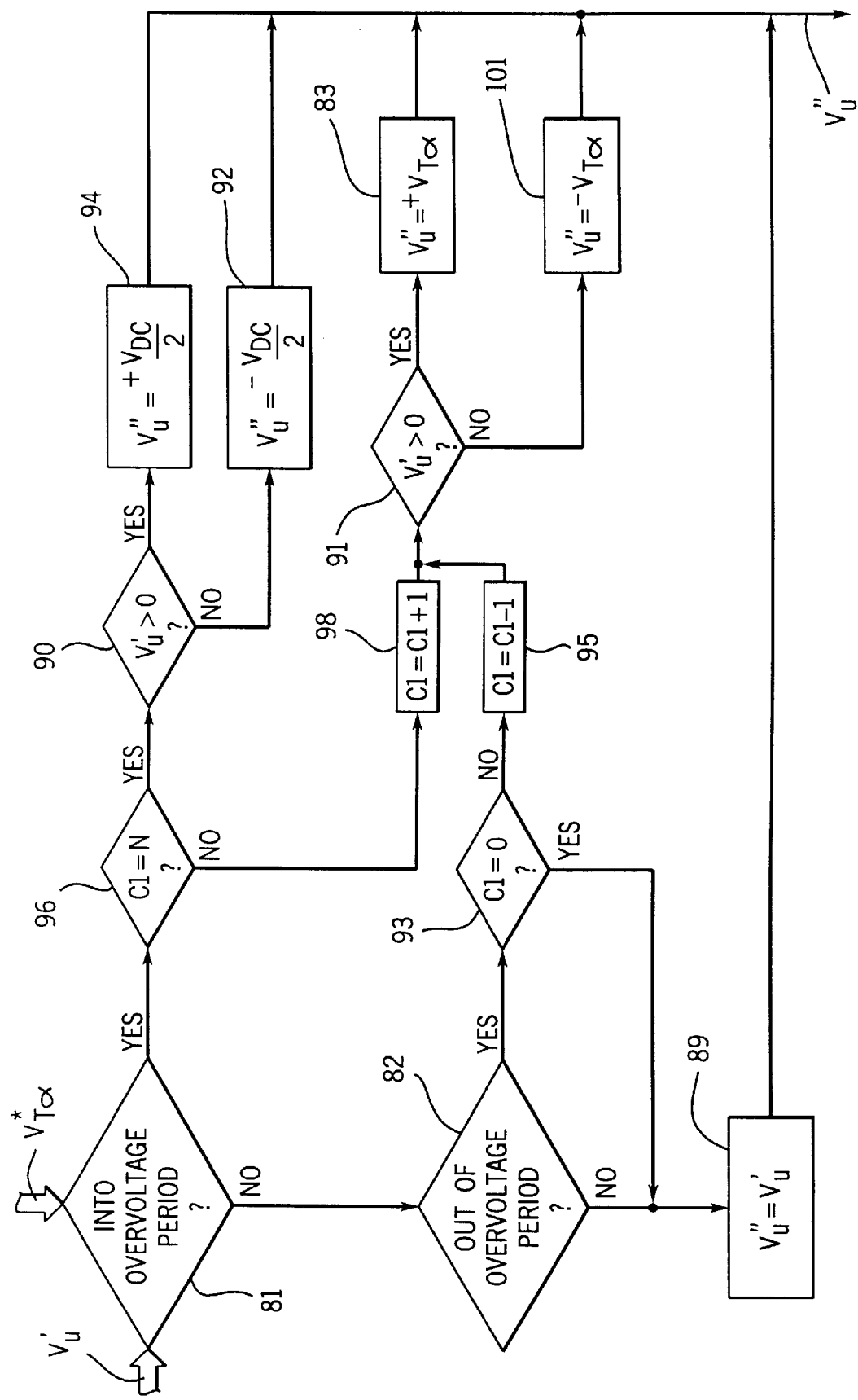
FIG. 14 is a flow chart illustrating a second preferred inventive method.

Referring specifically to FIG. 14, in accordance with the hybrid method, at decision block 81 module 108 first determines whether or not, during a carrier period, signal $V_u'$ is entering, or going into, an overvoltage period. An overvoltage period is any continuous period over which signal $V_u'$ exceeds magnitude $V_{T\alpha}*$.

For the purposes of the present invention, a modulating signal $V_u'$ is said to be "going into" an overvoltage period during all the first N carrier periods in which signal $V_u'$ exceeds magnitude $V_{T\alpha}*$. The last N carrier periods during which $V_u'$ is greater than $V_{T\alpha}*$ are said to be when the modulating signal is "coming out of" an overvoltage period. In order to simplify this explanation it will be assumed N is 2.

For the purposes of the present invention any method can be used to determine if a modulating signal $V_u'$ is "going into" or "coming out of" an overvoltage period. For example, at block 81 module 108 may determine first if the modulating signal $V_u'$ is in an overvoltage period. Second, where the signal is in an overvoltage period module 108 may determine if the signal $V_u'$ is within N carrier periods of being out of the overvoltage period. Where signal $V_u'$ is not within N carrier periods of being out of the overvoltage period, module 102 recognizes that signal $V_u'$ is "going into" an overvoltage period or is within an overvoltage period and not within the first or last N carrier periods of overvoltage at block 81. Continuing, at block 82, the module 108 checks if signal $V_u'$ is in an overvoltage period and if so, recognizes that the signal $V_u'$ is "coming out of" the overvoltage period. In other words, the only signals passed to block 82 from block 81 are either signals that are not naturally in an overvoltage period or signals occurring curing the last N carrier periods of the overvoltage period during which signal $V_u'$ is "coming out of" the overvoltage period.

In FIG. 11a, during first carrier period $T_{c1}$ modulating signal $V_u'$ does not exceed magnitude $V_{T\alpha}*$. Therefore control drops down from block 81 through block 82 to block 89 where output $V_u''$ is set equal to $V_u'$. Comparing FIGS. 11a and 15a it can be seen that during period $T_{c1}$, because signal $V_u'$ is less than magnitude $V_{T\alpha}*$, signal $V_u''$ is unchanged and equals $V_u'$. Also referring to FIGS. 11b and 15b the resulting firing pulse $P_1''$ is unchanged and identical to pulse $P_1$.

Referring to FIGS. 14 and 11a, during second carrier period $T_{c2}$ signal $V_u'$ exceeds magnitude $V_{T\alpha}*$ and thus signal $V_u'$ is in an overvoltage period. Because period $T_{c2}$ is not one of the last N carrier periods in the immediate overvoltage period, signal $V_u'$ is either "going into" the overvoltage period during carrier period $T_{c2}$ or is in the overvoltage period and is not within the first N carrier periods of overvoltage. Thus, after block 81, at block 96 module 108 checks to see if a count C1 is equal to N.

Referring still to FIG. 14, initially, at the beginning of each overvoltage period count C1 is zero and therefore, during period $T_{c2}$ module 108 control jumps to block 98 and increments count C1 (i.e. C1=1). Next, at block 91, as at block 122 in FIG. 10, module 108 determines if signal $V_u'$ is positive. Referring again to FIG. 11a, during a second carrier period $T_{c2}$ signal $V_u'$ is positive. Note that while signal $V_u'$ could be negative, for the purposes of this explanation, signal $V_u'$ in FIG. 11a is always positive.

Because signal $V_u'$ is positive during period $T_{c2}$ control passes to block 83 and signal $V_u'$ is set equal to magnitude $V_{T\alpha}*$. During negative half phase signals $V_u'$ (not illustrated), control would instead pass from block 91 to block 101 where $V_u''$ is set equal to $-V_{T\alpha}*$.

Referring to FIG. 15a, for the purposes of comparison, signal $V_u'$ is illustrated via a dashed line and points where carrier signal 67 and signal $V_u'$ intersect have been identified via vertical dashed lines during periods $T_{c2}$, $T_{c3}$ and $T_{c4}$. The points of intersection between signals $V_u''$ and 67 are indicated by dotted lines and define the turn on and turn off times of pulses $P_1''$ through $P_4''$. At the end of period $T_{c2}$ and the beginning of period $T_{c3}$, whereas modulating signal $V_u'$ would have crossed signal 67 at times $\tau_{27}$ and $\tau_{28}$, modified signal $V_u''$ crosses signal 67 at time $\tau_{26}$ before time $\tau_{27}$ and at time $\tau_{29}$ after $\tau_{28}$. Thus, referring to FIGS. 11b and 15b, the off time between pulses $P_2''$ and $P_3''$ which correspond to modified signal $V_u''$ is clearly of a longer duration than the off time between pulses $P_2$ and $P_3$, which corresponds to signal $V_u''$.

The off time between pulses $P_2''$ and $P_3''$ is the critical dwell time $T_\alpha$. Thus, as indicated above, because signal $V_u'$ exceeded magnitude $V_{T\alpha}*$ during second carrier period $T_{c2}$, the off time at the end of period $T_{c2}$ and at the beginning of following period $T_{c3}$ was altered.

Referring still to FIGS. 14 and 15a, during third carrier period $T_{c3}$ module 108 determines that modulating signal $V_u'$ is in the overvoltage period bit is not within N carrier periods of being out of the overvoltage period. Thus, modulating signal $V_u'$ is still "going into" the overvoltage compensation period during carrier period $T_{c3}$. Control again passes to block 96 where module 108 again checks count C1. Because count C1 is 1 and N is 2, control passes to block 98 where count C1 is incremented (i.e. C1=2) and passes on to block 91. At block 91, because signal $V_u'$ is positive, control passes to block 83 and signal $V_u''$ is set equal to magnitude $V_{T\alpha}^*$. Thus, once again because signal $V_u'$ is in an overvoltage period during carrier period $T_{c3}$, the off time at the end of period $T_{c3}$ and the beginning of period $T_{c4}$ is modified.

Figure 15B:
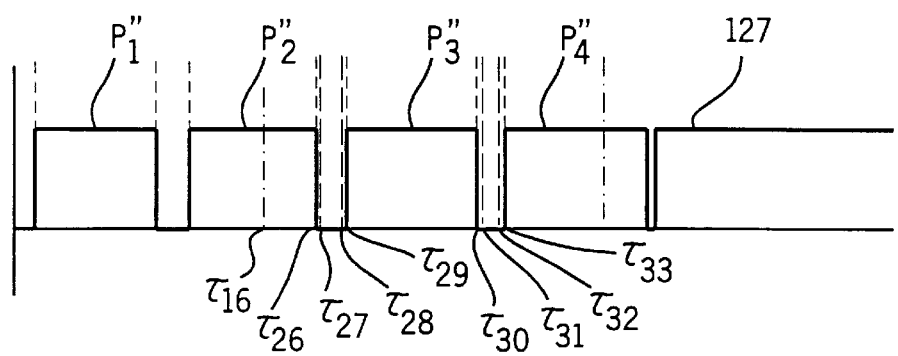

In FIGS. 15a and 15b, clearly, intersection times $\tau_{31}$ and $\tau_{32}$ for signal $V_u'$ define a period having a duration less than intersection times $\tau_{30}$ and $\tau_{33}$ associated with signal $V_u''$. Again, the off time between times $\tau_{30}$ and $\tau_{33}$ is equal to critical dwell time $T_\alpha$.

Continuing, during fourth carrier period $T_{c4}$, module 108 determines that modulating signal $V_u'$ is in the overvoltage period and not within N carrier periods of being out of the overvoltage period. Thus, signal $V_u'$ is still "going into" the compensation period. Control therefore passes to block 96 where count C1 is again compared to N. Now, count C1 is equal to N (i.e. C1=2) and control passes to block 90.

At block 90, module 108 determines that signal $V_u'$ is positive and control passes to block 94 where signal $V_u''$ is set equal to $$\frac{+V_{DC}}{2}.$$

In FIG. 15a signal $V_u''$ is set equal $$\frac{+V_{DC}}{2}$$

at time $\tau_{34}$ prior to the next intersection of signal $V_u''$ and signal 67 so that the off time at the end of period $T_{c4}$ is eliminated. During fifth period $T_{c5}$ and following periods, control continues to pass from block 81 through blocks 96, 90 and 94 such that signal $V_u''$ remains set equal to $$\frac{+V_{DC}}{2}$$

until the last N carrier periods of the overvoltage period. While in an overvoltage period, at block 81 module 108 monitors modulating signal $V_u'$ during the Nth next carrier period to determine when the modulating signal $V_u'$ is "coming out of" the overvoltage period. Although not illustrated, when the first carrier period which is not in the overvoltage period is identified, module 108 recognizes that signal $V_u'$ is "coming out of" the overvoltage period and control passes through blocks 81 and 82 to decision block 93.

At decision block 93, module 108 checks if count C1 is equal to zero. Where count C1 is not equal to zero, the last N carrier periods of the overvoltage period have not yet been limited. Thus, where N is 2, during the carrier period when module 108 initially recognizes that modulating signal $V_u'$ is coming out of an overvoltage period during the Nth next carrier period, count C1 is equal to 2 (i.e. equal to N) and therefore control passes to block 95. At block 95, count C1 is decremented by 1 and control is passed to decision block 91. At decision block 91, module 108 determines that signal $V_u'$ is positive and therefore control passes to block 83. At block 83, signal $V_u''$ is set equal to magnitude $V_{T\alpha}^*$. In other words, signal $V_u''$ is changed from $$\frac{+V_{DC}}{2}$$

to magnitude $V_{T\alpha}^*$. Signal $V_u''$ remains equal to magnitude $V_{T\alpha}^*$ for two carrier periods (i.e. until C1 is equal to zero). Such that the last two (i.e. last N) turn off times during the overvoltage period are set equal to $V_{T\alpha}^*$.

During the next carrier period which immediately precedes the first carrier period that is not in the overvoltage period, control passes through blocks 81 and 82 to block 93. Again, at block 93, module 108 compares count C1 to zero. Here, count C1 is equal to 1 and therefore control again passes to block 95 where count C1 is again decremented (i.e. count C1 is now equal to zero) and control passes to decision block 91. Once again, at decision block 91 module 108 determines that signal $V_u'$ is positive and control passes to block 83 where signal $V_u''$ is set equal to $V_{T\alpha}^*$.

During the next carrier period, control again passes down through blocks 81 and 82 to block 93. At block 93, module 108 determines whether or not court C1 is equal to zero. At this point, count C1 is zero and therefore control passes down to block 89. At block 89, signal $V_u''$ is again set equal to $V_u'$.

The above described process continues with module 108 comparing modulating signal $V_u'$ to magnitude $V_{T\alpha}^*$ to determine (1) if modulating signal $V_u'$ is greater than or equal to magnitude $V_{T\alpha}^*$ and, if so, (2), if modulating signal $V_u'$ is within the first or last N carrier periods of an overvoltage period. When signal $V_u'$ is greater than or equal to-magnitude $V_{T\alpha}^*$, signal $V_u'$ is altered in one of two ways to provide output signal $V_u''$. First, if signal $V_u'$ is within the first or last N carrier periods of any overvoltage period, signal $V_u'$ is altered so that signal $V_u''$ is equal to $+V_{T\alpha}^*$ when $V_u'$ is positive or equal to $-V_{T\alpha}^*$ when $V_u'$ is negative. Second, when in an overvoltage period and not within the first or last N carrier periods, signal $V_u'$ is set equal to either the positive or negative DC bus value $$\frac{\pm V_{DC}}{2}.$$

Referring now to FIG. 13c a modulation signal $V_u''$ which has been modified according to the inventive hybrid method is illustrated. In addition, to facilitate comparison, the original unmodified signal $V_u'$ is also illustrated, albeit divided by 2 to clearly show the different signals.

As with the PET method, with the hybrid method a post appears in the modulating signal $V_u''$ each time signal $V_u'$ exceeds $+V_{T\alpha}^*$ or drops below $-V_{T\alpha}^*$. The posts are indicated by numerals 308, 310, 312 and 314. In addition, on either side of each post 308, 310, 312 and 314 during the first and last N carrier periods of each overvoltage period, the modified modulating signal $V_u''$ is flat forming a porch 316, 318, 320, 322, 324, 326, 328 or 330. A porch can also be observed in FIG. 15a between times $\tau_{16}$ and $\tau_{35}$ where signal $V_u''$ is set equal to magnitude $V_{T\alpha}^*$.

It should be understood that the methods and apparatus described above are only exemplary and do not limit the scope of the invention, and that various modifications could be made by those skilled in the art that could fall under the scope of the invention. For example, while the above-described methods monitor the modulating signal magnitudes in real time, clearly they could monitor the signals several carrier cycles in advance so that relatively slow processors could be used to implement the invention. In addition referring to FIG. 9, while calculator 107 is used to find magnitude $V_{T\alpha}*$, clearly a look-up table correlating $V_{bus}$, $T_c$ and $T_\alpha$ could be provided instead of a calculator.

To apprise the public of the scope of this invention we make the following claims.

We claim:

1. A method for determining a critical dwell time for use by a motor controller, the controller including a signal generator, a PWM controller and an inverter, the generator providing modulating waveforms to the PWM controller which compares the modulating waveforms with a carrier signal to generate firing pulses which control the inverter, the inverter providing exciting voltage to a motor via supply lines, the exciting voltage corresponding to the firing pulses and having a maximum intended amplitude, the controller substantially eliminating exciting motor voltage greater than twice the maximum intended amplitude by generating the firing pulses such that periods between consecutive firing pulses are equal to or greater than the critical dwell time, the controller providing at least one motor parameter which can be used to determine the critical dwell time, the method comprising the steps of:

receiving the motor parameter;

using the motor parameter to determine the critical dwell time; and using the critical dwell time to modify the modulating waveforms thereby modifying the firing pulses.

2. The method of claim 1 wherein the at least one motor parameter includes both supply line inductance per unit length and supply line resistance per unit length, and the step of using includes the step of mathematically combining the inductance and resistance per unit length to determine the critical dwell time.

3. The method of claim 2 wherein the step of mathematically combining includes the step of combining according to the following equation:

$$T_\alpha = 3(2L_0/r_s)$$

where $T_\alpha$ is the critical dwell time, $L_0$ the inductance per unit supply line length and $r_s$ is the resistance per unit supply line length.

4. The apparatus of claim 3 wherein the processor mathematically combines according to the following equation:

$$T_\alpha = 3(2L_0/r_s)$$

where $T_\alpha$ is the critical dwell time, $L_0$ is the inductance per unit supply line length and $r_s$ is the resistance per unit supply line length.

5. The method of claim 1 wherein the at least one motor parameter includes both supply lines inductance per unit length and supply line resistance per unit length, and the motor controller includes a microprocessor and a memory unit including the inductance and resistance per unit length correlated with critical dwell times and the step of using includes the step of correlating the inductance and resistance per unit length with a critical dwell time in the table.

6. The method of claim 1 wherein the at least one motor parameter includes motor horsepower and the motor controller includes a microprocessor and a memory unit including motor horse power correlated with critical dwell times and the step of using includes the step of correlating the horsepower with a critical dwell time in the table.

7. A method for, during a commissioning procedure, generating a table of critical dwell times for use by a motor controller, the controller including a signal generator, a PWM controller and an inverter, the generator providing modulating waveforms to the PWM controller which compares the modulating waveforms with a carrier signal to generate firing pulses which control the inverter, the inverter providing exciting voltage to a motor via supply lines, the exciting voltage corresponding to the firing pulses and having a maximum intended amplitude, the controller substantially eliminating exciting motor voltage greater than twice the maximum intended amplitude by generating the firing pulses such that periods between consecutive firing pulses are equal to or greater than a critical dwell time, the critical dwell time dependent on various supply line parameters, the method comprising the steps of:

(a) providing a combination of inductance and resistance per unit supply line length;

(b) mathematically combining the inductance and resistance per unit length to determine the critical dwell time;

(c) storing at least one parameter which correlates with the inductance and resistance per unit length and the critical dwell time in a memory table;

(d) after a predetermined number of parameters and dwell times have been stored, skipping to step f;

(e) modifying the combination of inductance and resistance per unit length and repeating steps a through d; and (f) storing the table for use during normal motor operation.

8. The method of claim 7 wherein the step of mathematically combining includes the step of combining according to the following equation:

$$T_\alpha = 3(2L_0/r_s)$$

where $T_\alpha$ is the critical dwell time, $L_0$ is the inductance per unit supply line length and $r_s$ is the resistance per unit supply line length.

9. The method of claim 7 wherein the at least one parameter includes both the inductance and resistance per unit length.

10. The method of claim 7 wherein the at least one parameter includes motor horsepower typically used with supply lines having the inductance and resistance per unit length.

11. An apparatus for determining a critical dwell time for use by a motor controller, the controller including a signal generator, a PWM controller and an inverter, the generator providing modulating waveforms to the PWM controller which compares the modulating waveforms with a carrier signal to generate firing pulses which control the inverter, the inverter providing exciting voltage to a motor via supply lines, the exciting voltage corresponding to the firing pulses and having a maximum intended amplitude, the controller substantially eliminating exciting motor voltage greater than twice the maximum intended amplitude by generating the firing pulses such that periods between consecutive firing pulses are equal to or greater than the critical dwell time, the apparatus comprising:

an interface for providing at least one motor parameter which can be used to determine the critical dwell time;

a processor receiving and using the parameter to determine the critical dwell time; and a bus for providing the critical dwell time to the controller.

12. The apparatus of claim 11 wherein the at least one motor parameter includes both supply line inductance per unit length and supply line resistance per unit length, and the processor uses both the inductance and resistance per unit length by mathematically combining the inductance and resistance to determine the critical dwell time.

13. The apparatus of claim 11 wherein the controller uses the critical dwell time to modify the modulating waveforms thereby modifying the firing pulses.

14. The apparatus of claim 11 wherein the controller uses the critical dwell time to directly modify the firing pulses.

15. The apparatus of claim 11 wherein the at least one motor parameter includes both supply line inductance per unit length and supply line resistance per unit length, and the motor controller includes a memory unit including the inductance and resistance per unit length correlated with critical dwell times and the processor uses by correlating the inductance and resistance per unit length with a critical dwell time in the table.

16. An apparatus for, during a commissioning procedure, generating a table of critical dwell times for use by a motor controller, the controller including a signal generator, a PWM controller and an inverter, the generator providing modulating waveforms to the PWM controller which compares the modulating waveforms with a carrier signal to generate firing pulses which control the inverter, the inverter providing exciting voltage to a motor via supply lines, the exciting voltage corresponding to the firing pulses and having a maximum intended amplitude, the controller substantially eliminating exciting motor voltage greater than twice the maximum intended amplitude by generating the firing pulses such that periods between consecutive firing pulses are equal to or greater than a critical dwell time, the critical dwell time dependent on various supply line parameters, the apparatus comprising:

(a) an interface for providing a different combinations of inductance and resistance per unit supply line length;

(b) a processor for combining each combination of inductance and resistance per unit length to determine a critical dwell time associated with each combination; and (c) a memory for storing each combination and an associated critical dwell time in table form.

17. The apparatus of claim 16 wherein the processor mathematically combines according to the following equation:

$$T_\alpha = 3(2L_0/r_s)$$

where $T_\alpha$ is the critical dwell time, $L_0$ is the inductance per unit supply line length and $r_s$ is the resistance per unit supply line length.

* * * * *